US008370116B2

(12) United States Patent
Kidera et al.

(10) Patent No.: US 8,370,116 B2
(45) Date of Patent: Feb. 5, 2013

(54) HARNESS VERIFICATION APPARATUS, HARNESS VERIFICATION METHOD AND STORAGE MEDIUM

(75) Inventors: Masayuki Kidera, Kawasaki (JP); Kouji Demizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 398 days.

(21) Appl. No.: 12/786,667

(22) Filed: May 25, 2010

(65) Prior Publication Data
US 2010/0305908 A1 Dec. 2, 2010

(30) Foreign Application Priority Data

May 26, 2009 (JP) ................................. 2009-125921

(51) Int. Cl.
*G06F 17/50* (2006.01)
*G06F 7/48* (2006.01)
*G06F 19/00* (2006.01)
*G06T 15/00* (2006.01)
*G06T 17/00* (2006.01)

(52) U.S. Cl. ......... 703/1; 703/6; 703/7; 700/97; 700/98; 345/419; 345/420

(58) Field of Classification Search .................. 703/1, 6, 703/7; 700/97–98; 345/419–420
See application file for complete search history.

(56) References Cited

U.S. PATENT DOCUMENTS

| | | | | |
|---|---|---|---|---|
| 5,138,698 A | * | 8/1992 | Aldrich et al. | 345/427 |
| 5,506,950 A | * | 4/1996 | Hughes et al. | 345/420 |
| 5,623,583 A | * | 4/1997 | Nishino | 345/420 |
| 5,742,288 A | * | 4/1998 | Nishizaka et al. | 345/418 |
| 6,272,387 B1 | * | 8/2001 | Yoon | 700/83 |
| 6,647,314 B2 | * | 11/2003 | Kato et al. | 700/187 |
| 6,842,173 B2 | * | 1/2005 | Sakakura et al. | 345/419 |
| 6,867,768 B2 | * | 3/2005 | Sakakura et al. | 345/419 |

(Continued)

FOREIGN PATENT DOCUMENTS

| | | |
|---|---|---|
| EP | 2031526 A2 * | 3/2009 |
| JP | 08-273003 | 10/1996 |

(Continued)

OTHER PUBLICATIONS

Designing cable harness assemblies in virtual environments; F.M. Ng et al; Journal of Materials Processing Technology 107 (2000) pp. 37-43.*

*Primary Examiner* — Kamini S Shah
*Assistant Examiner* — Akash Saxena
(74) *Attorney, Agent, or Firm* — Staas & Halsey LLP

(57) ABSTRACT

A harness verification method includes placing a three-dimensional model in virtual space and displaying a model plane onto which an overhead view of the three-dimensional model is projected, setting reference planes in the virtual space and displaying on the display cross-section projection planes onto which cross sections defined by intersection of the three-dimensional model and the reference planes is projected; obtaining a pointing position operated by a pointing unit in the virtual space, designating the pointing position as an operation position, identifying the operation position as a pass point of a harness, generating curve segments each corresponding to section between two adjacent pass points, and storing in the storage unit definition information that defines a route of the harness on the basis of jointed curve segments; and displaying on the cross-section projection planes the route of the harness generated on the cross section on the basis of the definition information.

6 Claims, 20 Drawing Sheets

U.S. PATENT DOCUMENTS

| | | | | |
|---|---|---|---|---|
| 6,888,546 B1* | 5/2005 | Kim | | 345/424 |
| 6,906,710 B2* | 6/2005 | Matsuzaki et al. | | 345/419 |
| 6,968,289 B1* | 11/2005 | Tsuchiya et al. | | 702/155 |
| 6,970,755 B2* | 11/2005 | Sakakura et al. | | 700/97 |
| 7,013,236 B2* | 3/2006 | Nono et al. | | 702/159 |
| 7,062,416 B1* | 6/2006 | Arita et al. | | 703/2 |
| 7,200,537 B2* | 4/2007 | Ozaki | | 703/7 |
| 7,383,162 B2* | 6/2008 | Hashima et al. | | 703/2 |
| 7,403,829 B2* | 7/2008 | Yamane | | 700/97 |
| 7,480,596 B2* | 1/2009 | Hashima et al. | | 703/1 |
| 7,529,638 B2* | 5/2009 | Sawai et al. | | 702/150 |
| 7,558,705 B1* | 7/2009 | Hughes et al. | | 703/1 |
| 7,990,376 B2* | 8/2011 | Demizu et al. | | 345/420 |
| 7,996,190 B2* | 8/2011 | Huizar Rodriguez et al. | | 703/1 |
| 8,055,480 B2* | 11/2011 | Goebbels et al. | | 703/1 |
| 8,150,661 B2* | 4/2012 | Demizu et al. | | 703/1 |
| 8,174,522 B2* | 5/2012 | Watanabe | | 345/419 |
| 8,194,066 B2* | 6/2012 | Nagakura et al. | | 345/419 |
| 8,255,189 B2* | 8/2012 | Vedula et al. | | 703/1 |
| 2002/0040256 A1* | 4/2002 | Fujioka | | 700/97 |
| 2003/0020711 A1* | 1/2003 | Sakakura et al. | | 345/420 |
| 2003/0050723 A1* | 3/2003 | Ozaki | | 700/97 |
| 2003/0160786 A1* | 8/2003 | Johnson | | 345/419 |
| 2004/0019399 A1* | 1/2004 | Kabasawa | | 700/121 |
| 2004/0130878 A1* | 7/2004 | Sawai et al. | | 361/826 |
| 2004/0230403 A1* | 11/2004 | Tsuchiya et al. | | 703/1 |
| 2005/0119773 A1* | 6/2005 | Hashima et al. | | 700/97 |
| 2005/0240383 A1* | 10/2005 | Hashima et al. | | 703/7 |
| 2007/0232120 A1* | 10/2007 | Shimizu | | 439/358 |
| 2008/0015824 A1* | 1/2008 | Grichnik et al. | | 703/1 |
| 2009/0276194 A1* | 11/2009 | Kidera et al. | | 703/1 |
| 2010/0122451 A1* | 5/2010 | Yang et al. | | 29/703 |
| 2010/0235157 A1* | 9/2010 | Vedula et al. | | 703/13 |
| 2010/0265251 A1* | 10/2010 | Vining et al. | | 345/420 |
| 2010/0305908 A1* | 12/2010 | Kidera et al. | | 703/1 |
| 2011/0049754 A1* | 3/2011 | Mahaffy | | 264/219 |
| 2011/0267337 A1* | 11/2011 | Getto et al. | | 345/419 |
| 2012/0173207 A1* | 7/2012 | Abe et al. | | 703/1 |

FOREIGN PATENT DOCUMENTS

| | | |
|---|---|---|
| JP | 2003-157289 | 5/2003 |
| JP | 2004-362191 | 12/2004 |
| JP | 2009076033 A * | 4/2009 |
| WO | WO2004/104868 A1 | 12/2004 |

* cited by examiner

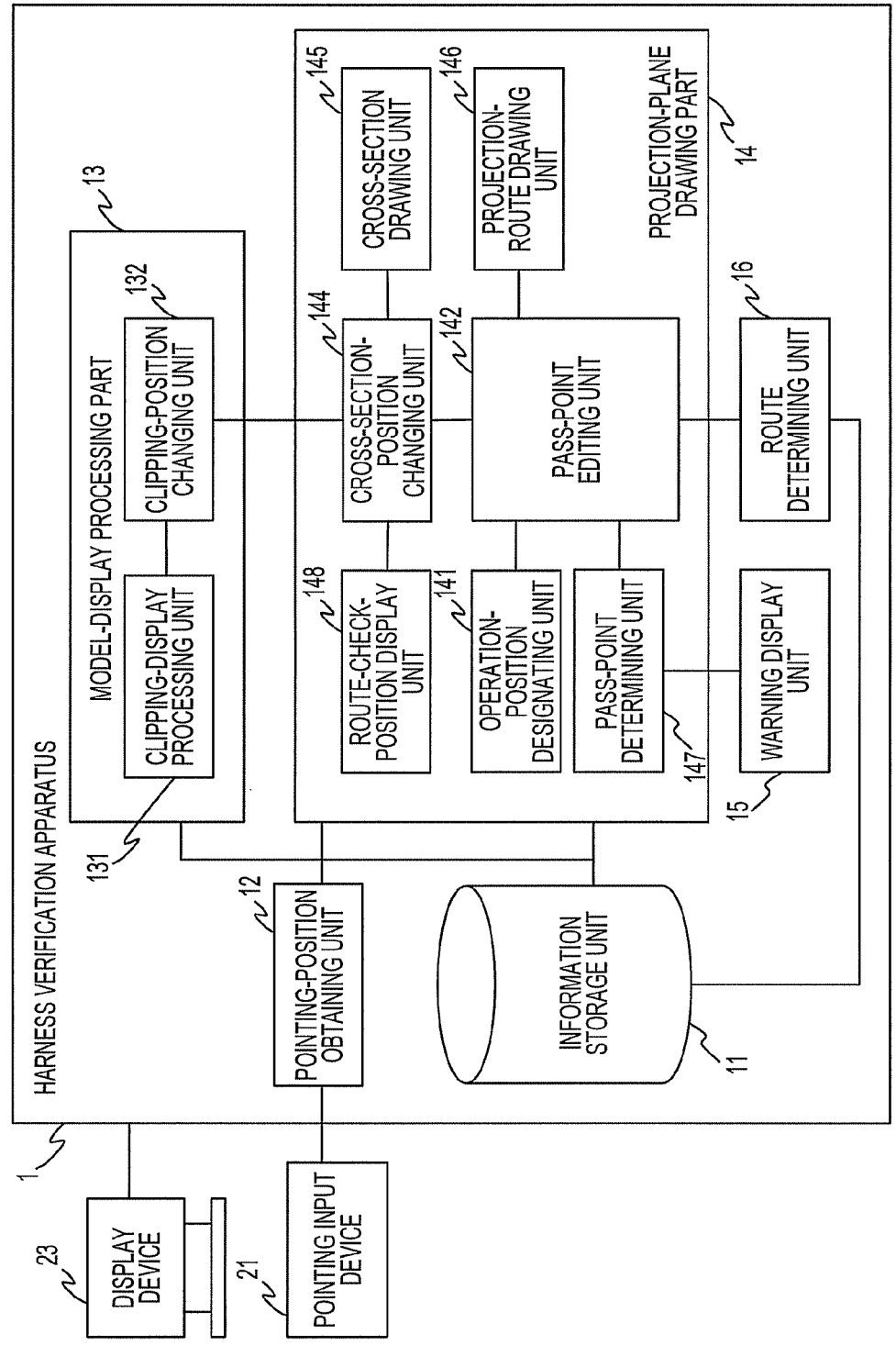

FIG.2A

| PART No. | PART NAME | PARENT PART | POSITION | SHAPE No. |
|---|---|---|---|---|
| #1 | E-CASH TERMINAL | – | (0, 0, 0) | – |
| #2 | UPPER COVER | #1 | (200, 100, 720) | – |
| #3 | TOUCH PANEL | #2 | (50, 100, 720) | #1 |
| #4 | CARD SLOT | #2 | (35, 120, 600) | #2 |
| #5 | COVER COMPONENT | #2 | (50, 100, 720) | #3 |
| #6 | DOOR FIXTURE | #1 | (200, 150, 300) | – |
| ⋮ | | | | |

FIG.2B

| SHAPE No. | NUMBER OF POLYGONS | 3D DATA | | | | |
|---|---|---|---|---|---|---|
| | | POLYGON 1 | POLYGON 2 | POLYGON 3 | ... | POLYGON N |
| #1 | #126 | (0.5, 20, 3.4)<br>(5, 20, 3.8)<br>(10, 20, 3.7) | (0.5, 10, 3.5)<br>(0.5, 20, 3.2)<br>(0, 30, 7.7) | (0.5, 20, 3.4)<br>(5, 20, 3.8)<br>(10, 20, 3.7) | ... | (0.1, 2.2, 0)<br>(0.2, 2.8, 0)<br>(0.3, 2.2, 5) |
| #2 | #48 | (0.3, 10, 3.4)<br>(2.5, 8.2, 5.8)<br>(1.2, 3.4, 2.7) | (1.5, 10, 2.5)<br>(0.4, 10, 3.6)<br>(0.2, 20, 7.7) | (0.5, 20, 3.4)<br>(5, 20, 3.8)<br>(10, 20, 3.7) | ... | (0.3, 3.2, 50)<br>(1.1, 2.1, 50)<br>(0.1, 5.5, 10) |
| #3 | #32 | (0.7, 5.2, 3.3)<br>(5.6, 0.3, 3.4)<br>(1.3, 6.3, 3.5) | (0.5, 10, 1.5)<br>(0.1, 0, 2.2)<br>(0, 0, 1.7) | (0.5, 20, 3.4)<br>(5, 20, 3.8)<br>(10, 20, 3.7) | ... | (0.6, 3.1, 5)<br>(1.2, 9, 3)<br>(0.1, 3.2, 2) |
| #4 | #64 | (6.3, 8.3, 3.6)<br>(5.2, 10, 3.4)<br>(8.2, 10.3, 3.2) | (0.5, 10, 2.5)<br>(0.5, 20, 2.2)<br>(0, .0, 1.7) | (0.5, 20, 3.4)<br>(5, 20, 3.8)<br>(10, 20, 3.7) | ... | (0.7, 2.2, 2)<br>(1.8, 2.5, 1)<br>(0.5, 0, 4.5) |
| ⋮ | ⋮ | ⋮ | | | | |

FIG.3

| REFERENCE PLANE No. | REFERENCE PLANE No. | POSITION | NORMAL DIRECTION | CLIPPING DISPLAY |
|---|---|---|---|---|
| #1 | X | ( 0, 0, 0 ) | ( 1, 0, 0 ) | POSITIVE DIRECTION |
| #2 | Y | ( 0, 50, 0 ) | ( 0, 1, 0 ) | NEGATIVE DIRECTION |
| #3 | Z | ( 0, 0, 100 ) | ( 0, 0, 1 ) | Off |
| ⋮ | | | | |

| HARNESS NUMBER | NAME | NUMBER OF PASS POINTS | OVERALL LENGTH | CURVATURE | COLOR | CABLE RADIUS | SECTION 1 | ... | SECTION N |
|---|---|---|---|---|---|---|---|---|---|
| 1 | CABLE 1 | 4 | 170 | 20 | RED | 1 | 1 | ... | 3 |
| 2 | CABLE 2 | 3 | 200 | 30 | BLUE | 0.5 | 4 | ... | 5 |
| 3 | CABLE 3 | 6 | 1030 | 40 | RED | 1 | 6 | ... | 10 |
| : | | | | | | | | ... | |

114

| SECTION No. | SECTION LENGTH | START POINT PASSING DIRECTION | END POINT PASSING DIRECTION | CONTROL POINT 1 | ... | CONTROL POINT 6 |
|---|---|---|---|---|---|---|
| 1 | 30 | (1,0,0) | (0,1,0) | (100,250,0) | ... | (120,250,15) |
| 2 | 100 | (0,1,0) | (0.5,0.5,0.71) | (120,250,15) | ... | (110,200,70) |
| 3 | 40 | (0.5,0.5,0.71) | (0,-1,0) | (110,200,70) | ... | (110,220,45) |
| : | | | | | ... | |

P1-P3: PASS POINT

C1-C6: CONTROL POINTS

HARNESS VERIFICATION APPARATUS, HARNESS VERIFICATION METHOD AND STORAGE MEDIUM

CROSS-REFERENCE TO RELATED APPLICATION

This application is based upon and claims the benefit of priority from the prior Japanese Patent Application No. 2009-125921 filed on May 26, 2009, the entire contents of which are incorporated herein by reference.

BACKGROUND

1. Field

The embodiments discussed herein are related to harness verification apparatuses for supporting generation and verification of harness routes.

2. Related Art

In design and manufacturing processes, three-dimensional display techniques for displaying objects in three dimensions have been used as essential techniques in recent years. Various types of verification tool systems, such as computer aided design (CAD) systems and mockup generation systems called digital mockups, help users achieve faster product development by providing various verification functions using three-dimensional display techniques.

For harnesses included in electronic apparatuses to be displayed as objects, the above-described tool systems allow users to generate, change, and verify the routes through three-dimensional models in virtual space.

Typically, harness routes are defined by a routing method. With this method, a route of a harness is defined by selecting feature points (e.g., portions of a model, centers of holes, and pre-defined connector positions) to sequentially define pass points of the harness, and repeating the selection of such feature points.

As a technique for inputting routing diagrams, there is a known technique in which designated points are inputted into a CAD system, a wiring route is determined from a plurality of routing patterns, and three-dimensional routing data is generated.

As a way to associate two-dimensional graphic data with three-dimensional stereoscopic data, there is a known technique in which a correspondence between three-dimensional stereoscopic data and two-dimensional graphic data from which the three-dimensional stereoscopic data is generated is stored and then, the two-dimensional graphic data is converted to three-dimensional graphic data.

Japanese laid-open Patent Publications Nos. 2003-157289 and 8-273003 are examples of related art.

FIG. 20A illustrates a display example of a three-dimensional model placed in virtual space to represent an exterior of an entire electronic apparatus having a harness, the three-dimensional model being displayed on a display screen of a CAD system.

In the three-dimensional model displayed on the CAD screen of FIG. 20A, since the inside of an electronic apparatus 900 is entirely covered with a front cover 901 and a side cover 902, the user cannot check the internal state of the electronic apparatus 900.

Therefore, the user operates the CAD system to hide the front cover 901 and the side cover 902 on the CAD screen.

FIG. 20B illustrates a display example obtained by hiding some covers and housing components of the electronic apparatus 900 of FIG. 20A by user's operation of the CAD system.

In the display state of FIG. 20B, the user further operates the CAD system to hide or display internal components etc. for easy route verification for a harness 911. That is, the user performs route verification for the harness 911 while operating the CAD system to hide or display components, such as a panel cover 912, a first unit 913, a second unit 914, a first metal plate 915, and a second metal plate 916, on the CAD screen.

FIG. 20C illustrates an example obtained by displaying the display example of FIG. 20A in clipping mode, on the basis of the position of a specified reference plane, for the user to perform route verification for the harness 911 in the electronic apparatus 900. When a shape of the electronic apparatus 900 is three-dimensionally displayed, the clipping mode allows the user to view an internal configuration of the electronic apparatus 900 by hiding one side (e.g., the viewing side of the display) in any reference plane. Generally, in virtual space, a three-dimensional model in which a shape on the viewing side (or the front side) of a reference plane is hidden is drawn in clipping mode.

To perform route verification for the harness 911 on the CAD display screen, the user performs an operation for displaying the harness 911 in the electronic apparatus 900 by hiding or displaying an outer cover and internal components of the electronic apparatus 900, or by hiding partial space of the electronic apparatus 900 in clipping mode in a reference plane specified on the electronic apparatus 900.

If a harness route interferes with other components in virtual space, it is necessary to change the harness route to avoid actual interference. For easier checking of the harness route, the user has to frequently perform operations of displaying or hiding each component and changing the position of clipping display.

In the processes of harness route generation and verification, the user has to perform cumbersome operations, such as switching between displaying and hiding components and changing the clipping position, which require enormous efforts.

Moreover, since such operations of the CAD system need to be performed repeatedly in a skilled manner, the harness route generation and verification cannot be easily done by any user.

SUMMARY

According to an embodiment, a harness verification method includes placing a three-dimensional model in virtual space and displaying a model plane onto which an overhead view of the three-dimensional model is projected; setting reference planes in the virtual space and displaying on the display cross-section projection planes onto which cross sections defined by intersection of the three-dimensional model and the reference planes is projected; obtaining a pointing position operated by a pointing unit in the virtual space; designating the pointing position as an operation position; identifying the operation position as a pass point of a harness, generating curve segments each corresponding to section between two adjacent pass points, and storing in the storage unit definition information that defines a route of the harness on the basis of jointed curve segments; and displaying on the cross-section projection planes the route of the harness generated on the cross section on the basis of the definition information.

It is to be understood that both the foregoing summary description and the following detailed description are explanatory as to some embodiments of the present invention, and not restrictive of the present invention as claimed.

BRIEF DESCRIPTION OF THE DRAWINGS

FIG. 1 illustrates an exemplary configuration of a harness verification apparatus.

FIGS. 2A and 2B illustrate an exemplary model configuration table and an exemplary shape table, respectively.

FIG. 3 illustrates an exemplary reference plane table.

FIG. 4 illustrates an exemplary harness table.

DESCRIPTION OF EXAMPLE EMBODIMENTS

Figure 5:
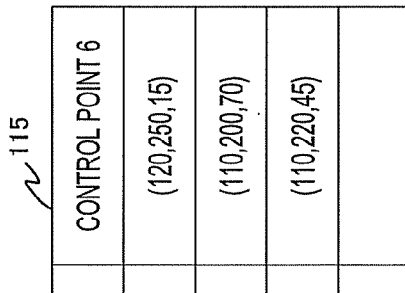
FIG. 5 illustrates an exemplary section detail table.

FIG. 1 illustrates an exemplary configuration of a harness verification apparatus.

In the present embodiment, an apparatus 3 (see FIG. 7) that is an object to be processed by a harness verification apparatus 1 is an electronic apparatus having a housing that includes a circuit board unit and components with harnesses. FIG. 7 to FIG. 14 (described below) illustrate display examples of a three-dimensional model of the apparatus 3 and a harness 30 in the apparatus 3.

On the basis of design data for the apparatus 3 to be processed, the harness verification apparatus 1 generates a three-dimensional model of the apparatus 3 in virtual space. The harness verification apparatus 1 draws a model plane and cross-section projection planes on a screen of a display device 23. The model plane is a plane onto which an overhead view of the three-dimensional model of the apparatus 3 is projected. The cross-section projection planes are planes onto which two-dimensional shapes of the three-dimensional model of the apparatus 3 are projected. The cross-section projection planes are generated by reference planes (cross sections) of the three-dimensional model, the reference planes being located at positions specified in virtual space on the basis of positional information specified by user's operation of a three-dimensional pointing input device (hereinafter referred to as a mouse) 21.

The harness verification apparatus 1 sets two or more reference planes defined by any positions and different vectors in virtual space, and draws a projection plane for each of the set reference planes. Hereinafter, a projection plane where operation positions controlled with the mouse 21 are detected is referred to as an operation plane, and the other projection plane is referred to as a tracking plane.

To generate, change, or verify a route of the harness 30 included in the apparatus 3, the harness verification apparatus 1 sets pass points P on the route of the harness 30 on the basis of positional information about virtual positions of a mouse pointer moved by the user on one projection plane (operation plane). On the basis of positional information about positions of the set pass points P in virtual space, the harness verification apparatus 1 identifies the position of each of the reference planes. Then, on the display device 23, the harness verification apparatus 1 draws a projection plane for displaying a cross section that shows a two-dimensional shape of a three-dimensional model of the apparatus 3 in the identified reference plane.

The harness verification apparatus 1 defines the route of the harness 30 on the basis of the set pass points P. Then, on the display device 23, the harness verification apparatus 1 draws a projection plane where the shape of the harness route in the identified reference plane is displayed on the cross section.

Additionally, on the display device 23, the harness verification apparatus 1 draws a model plane for displaying a model obtained by clipping the three-dimensional model of the apparatus 3 in the reference planes.

The harness verification apparatus 1 obtains a position in virtual space indicated by the mouse pointer that moves in synchronization with movement of the mouse 21, and updates the reference planes on the basis of the obtained position. Thus, the harness verification apparatus 1 updates the projection plane for displaying the two-dimensional shape of the three-dimensional model of the apparatus 3, or the model plane for displaying a model obtained by clipping the three-dimensional model of the apparatus 3 in the reference planes, the model showing an overhead view of the three-dimensional model of the apparatus 3.

The user can always view a cross section of the three-dimensional model of the apparatus 3, the cross section being a plane where the position of the mouse pointer appears. Therefore, the user can easily perform route generation and verification for the harness 30 while checking the route defined by added or updated pass points on the route of the harness 30.

As illustrated in FIG. 1, the harness verification apparatus 1 includes an information storage unit 11, a pointing-position obtaining unit 12, a model-display processing part 13, a projection-plane drawing part 14, a warning display unit 15, a route determining unit 16, the mouse 21, and the display device 23.

The information storage unit 11 stores design information, reference plane information, and harness information. The design information is information about the shape and location of each component of the apparatus 3. The design information is used to generate a three-dimensional model of the apparatus 3. The reference plane information is information representing each plane serving as a reference for displaying cross-sectional projection images of the three-dimensional model of the apparatus 3 and for displaying the three-dimensional model in clipping mode. The harness information represents a shape of each harness 30 included in the apparatus 3 and a route of the harness 30.

The design information and information about the shapes and material properties of each harness 30 are obtained from an external CAD system (not shown) in advance and stored in the information storage unit 11. The reference plane information is entered by the user and stored in the information storage unit 11.

The design information is stored, for example, in a model configuration table 111 and a shape table 112. The model configuration table 111 stores information about the identification and location of each component of the apparatus 3. The shape table 112 stores three-dimensional information about the shape of each component.

FIG. 2A illustrates an example of the model configuration table 111, and FIG. 2B illustrates an example of the shape table 112.

The model configuration table 111 illustrated in FIG. 2A contains data, such as "part number" (part No.), "part name", "parent part", "position", and "shape number" (shape No.), for each component of the apparatus 3.

"Part number" (part No.) and "part name" identify a component (part). "Parent part" is information that indicates, by part number, an upper-level component to which the component belongs. "Position" is information that indicates a position (i.e., a coordinate value of the start point) of the component in the three-dimensional model of the apparatus 3. "Shape number" (shape No.) is information that indicates shape information about the component by the corresponding shape number in the shape table 112.

The shape table 112 illustrated in FIG. 2B contains data about the shape of each component of the apparatus 3. Specifically, the shape table 112 contains data, such as "shape number" (shape No.), the "number of polygons" forming the shape, and "three-dimensional data" indicating vertex coordinate sets for each of the polygons forming the shape.

For example, the model configuration table 111 of FIG. 2A shows that the part No. 3 "touch panel" is a component belonging to the part No. 2 "upper cover" (parent part), located at start point coordinates (50,100,720) in the three-dimensional model, and identified by the shape information (three-dimensional data) corresponding to the shape No. 1 in the shape table 112.

For example, the shape table 112 of FIG. 2B shows that the shape of the shape No. 1 corresponding to the shape of the part No. 3 "touch panel" in the model configuration table 111 is formed by 126 polygons (i.e., polygon e ranging from 0 to N) identified by vertex coordinates of polygon 1 (0.5,20,3.4), (5,20,3.8), and (10,20,3.7); vertex coordinates of polygon 2 (0.5,10,3.5), (0.5,20,3.2), and (0,30,7.7); . . . ; and vertex coordinates of polygon N (=125) (0.1,2.2,0), (0.2,2.8,0), and (0.3,2.2,5).

The reference plane information is definition information that defines one or more reference planes for specifying one or more cross sections of a three-dimensional model of the apparatus 3 and a clipping position of the three-dimensional model.

A reference plane is a plane having an unlimited range (area) and defined by one position and one vector in virtual space where a three-dimensional model of the apparatus 3 is developed.

FIG. 3 illustrates an example of a reference plane table 113.

The reference plane table 113 contains data, such as "reference plane No.", "name", "position", "normal direction", and "clipping display", for each reference plane.

"Reference plane No." and "name" are information that identifies a reference plane. A name, such as X, Y, or Z, is given to the reference plane.

"Position" is information that indicates a position of a three-dimensional model of the apparatus 3 in virtual space. "Normal direction" is information that defines a vector in virtual space. The vector is a normal vector having a magnitude of one.

"Clipping display" is information that indicates a direction of display space from a reference plane in clipping mode. In "clipping display", a positive direction is a direction in which a coordinate value increases along the coordinate axis, while a negative direction is a direction in which a coordinate value decreases along the coordinate axis. When "clipping display" for a reference plane is OFF, the three-dimensional model is not clipped by the reference plane.

The reference plane table 113 of FIG. 3 shows that a reference plane with the reference plane No. 1 (X reference plane) is a plane defined by a position (0,0,0) and a vector (1,0,0) in virtual space. The reference plane table 113 also shows that, in clipping mode, space in the positive direction of this reference plane (e.g., in the opposite direction of the viewing side) is displayed.

Each reference plane in the reference plane table 113 is set, for example, on the basis of user input for a connector position serving as a start point of the harness 30 (obtained by referring to the model configuration table 111 of FIG. 2A) or any point selected by the user. The user can set a plurality of any reference planes.

In the following description, a plane identified by the reference plane No. 1 in the reference plane table 113 is referred to as an "X reference plane", a plane identified by the reference plane No. 2 in the reference plane table 113 is referred to as a "Y reference plane", a cross section based on the "X reference plane" is referred to as an "X cross section", and a cross section based on the "Y reference plane" is referred to as a "Y cross section".

The harness information described above is stored, for example, in a harness table 114 and a section detail table 115. The harness table 114 stores information about identification, material properties, and layout (extreme points and pass points) of each harness 30. The section detail table 115 defines a curve segment that represents a route in each of sections divided by extreme points and pass points of each harness 30.

When a harness 30 for which a route is to be generated is designated by the user, a record for the designated harness 30 is generated in the harness table 114. When a pass point P of the harness 30 is selected on a projection plane onto which a cross section of the apparatus 3 is projected, a section between the selected pass point P and the previous pass point P is generated and detailed data for a route in the generated section is added to the harness table 114.

FIG. 4 illustrates an example of data in the harness table 114. FIG. 5 illustrates the section detail table 115.

The harness table 114 of FIG. 4 contains data, such as "harness number", "name", the "number of pass points", "overall length", "curvature", "color", "cable radius", and information about a plurality of sections ("section 1" to "section N") for each harness 30.

"Harness number" is information that identifies each harness 30. The "number of pass points" is information that indicates the number of pass points P for defining a route of the harness 30.

Each of the plurality of sections ("section 1" to "section N") of the harness 30 is defined by a selected pass point Pn and its previous pass point P(n-1). In the harness number 1 "cable 1" in the harness table 114, for example, "section 1" is a section between the pass point P1 and the pass point P2 and "section 2" is a section between the pass point P2 and the pass point P3. In this manner, this cable 1 has three sections (N sections) from the pass point P1 to the pass point P4. Note here that N is obtained by subtracting one from the number of pass points.

In the harness table 114, a value set for each section of the harness 30 is a number that identifies detailed information about the section. This number corresponds to section information number ("section No.") in the section detail table 115 of FIG. 5. For example, "section 1" of the harness number 1 in the harness table 114 corresponds to detailed information in the record of the section No. 1 in the section detail table 115.

"Overall length", "curvature", "color", and "cable radius" in the harness table 114 indicate material properties of each harness 30. The harness table 114 may be configured not to contain information indicating material properties of each harness 30.

As detailed information about each section of a route of the harness 30, the section detail table 115 of FIG. 5 contains data, such as section information number ("section No."), "section length", "start point passing direction", "end point passing direction", and a plurality of control points ("control point 1" to "control point 6").

The number of control points defined in the section detail table 115 depends on the type of free curve forming a curve segment that represents a route in each section of the harness 30. For example, a free curve in virtual space can be expressed by a Bézier curve. Higher-order Bézier curves are used to express more complicated curves.

An N-th order Bézier curve is controlled by using (N+1) control points. In the present embodiment, a route of the harness 30 is expressed by a fifth-order Bézier curve. A curve for expressing a route of the harness 30 is not limited to a fifth-order Bézier curve, and any known parametric free curve may be used.

Section information number ("section No.") in the section detail table 115 is information that identifies a record of section detailed information. "Section length" in the section detail table 115 is information that indicates the length of a curve that represents a route in the section of the harness 30.

"Start point passing direction" is information indicating a passing direction at the pass point P serving as a start point of each section, and "end point passing direction" is information indicating a passing direction at the pass point P serving as an end point of the section. Each value in "start point passing direction" and "end point passing direction" represents a normal vector having a magnitude of one. A plurality of control points C1 to Cm define a curve that represents a route between a start point (pass point C1) and an end point (pass point Cm) of the section. Each control point is represented by a coordinate value, such as that shown in the section detail table 115.

Figure 6A:
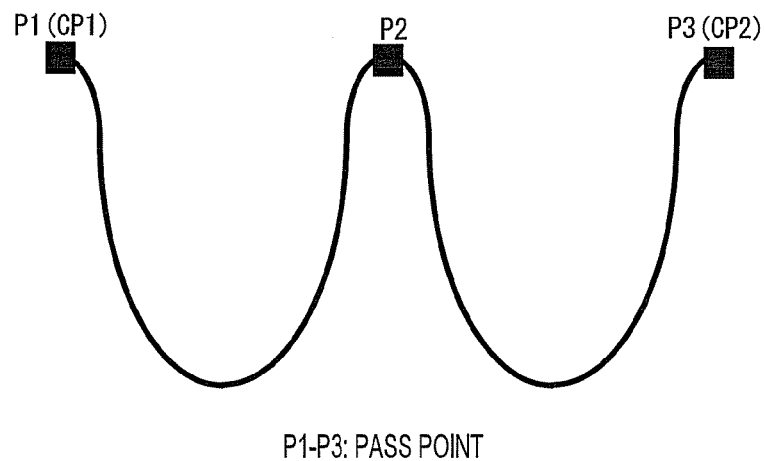
FIGS. 6A and 6B explain a curve representing a harness route.
Figure 6B:
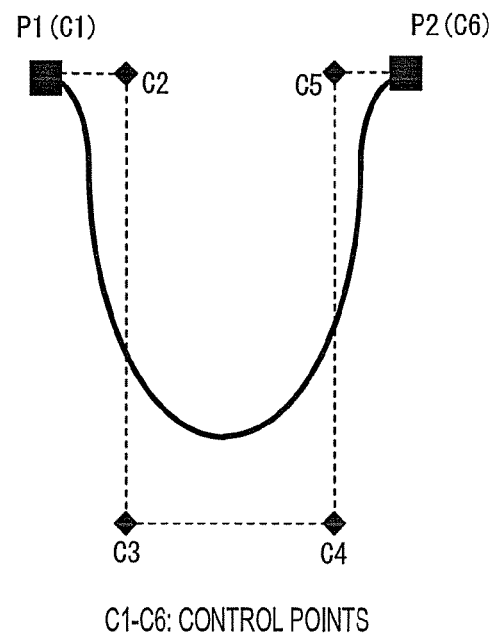

FIG. 6A and FIG. 6B are diagrams for describing a route of the harness 30.

FIG. 6A illustrates an example of an entire route of the harness 30. FIG. 6B illustrates one section of the route of the harness 30.

In the route of the harness 30 illustrated in FIG. 6A, the pass points P1 and P3 corresponding to extreme points (start and end points) are positions (CP1 and CP2) at which the harness 30 is connected to connectors. The pass point P2 in the middle is selected by the user.

The route of the harness 30 is expressed by joining curve segments corresponding to sections obtained by dividing the route at the pass points P. For example, a section between the pass points P1 and P2 and a section between the pass points P2 and P3 correspond to a plurality of sections ("section 1" to "section 2") in the harness table 114. A curve segment for each section is defined by a start point passing direction, an end point passing direction, and a plurality of control points C1 to Cm in the corresponding section information in the section detail table 115.

As illustrated in FIG. 6B, when a curve for each section of the route of the harness 30 is expressed by a fifth-order Bézier curve, a curve segment is defined by the following six control points: a start point of the section (pass point) P1=C1, four control point C2 to C5, and an end point of the section (pass point) P2=C6.

Referring to FIG. 6A, in the section between the pass points P1 and P2 ("section 1") and the section between the pass points P2 and P3 ("section 2"), the passing direction and coordinate value of the control point C6 that is the end point P2 of "section 1" are passed to the control point C1 that is the start point P2 of "section 2". Thus, the curve segment for "section 1" is joined to the curve segment for "section 2".

Vectors of the start point passing direction and end point passing direction and the control points in the section detail table 115 may be determined by a pass-point editing unit 142 (see FIG. 1) by taking material properties in the harness table 114 and the direction of gravity into account.

The pointing-position obtaining unit 12 (see FIG. 1) detects the amount of movement corresponding to a three-dimensional direction inputted with the mouse 21, and obtains positional information (coordinate value) about the position in virtual space pointed at with the mouse 21.

In accordance with a display instruction from the user to display a three-dimensional model of the apparatus 3, the model-display processing part 13 reads the corresponding design data for the apparatus 3 from the information storage unit 11. On the basis of the read design data, the model-display processing part 13 generates a three-dimensional model of the apparatus 3 in virtual space. The model-display processing part 13 then draws a model plane onto which an overhead view of the three-dimensional model is projected. Alternatively, the model-display processing part 13 draws a model plane onto which the three-dimensional model clipped by a reference plane at any position is projected.

As illustrated in FIG. 1, the model-display processing part 13 includes a clipping-display processing unit 131 and a clipping-position changing unit 132.

The clipping-display processing unit 131 refers to the reference plane table 113 and draws a model plane that displays a three-dimensional model of the apparatus 3 only in specified directions from reference planes (an X reference plane and a Y reference plane) for which clipping mode is selected.

When the reference plane table 113 is changed, the clipping-position changing unit 132 changes the position of clipping performed by the clipping-display processing unit 131, on the basis of the positions of the reference planes for which clipping mode is selected.

The projection-plane drawing part 14 draws projection planes on the display device 23. The projection planes are planes onto which a three-dimensional model of the apparatus 3 and a route of the harness 30 in cross sections at any positions in virtual space are projected.

Specifically, the projection planes each are obtained by superimposing a projection route generated by a projection-route drawing unit 146 on a cross section generated by a cross-section drawing unit 145. The cross section generated by the cross-section drawing unit 145 is a cross section onto which a two-dimensional shape in a plane (cross section) defined by intersection of the three-dimensional model of the apparatus 3 and a reference plane is projected. The projection route generated by the projection-route drawing unit 146 is a route projected onto a plane (cross section) defined by intersection of the route of the harness 30 and a reference plane.

Figure 7:
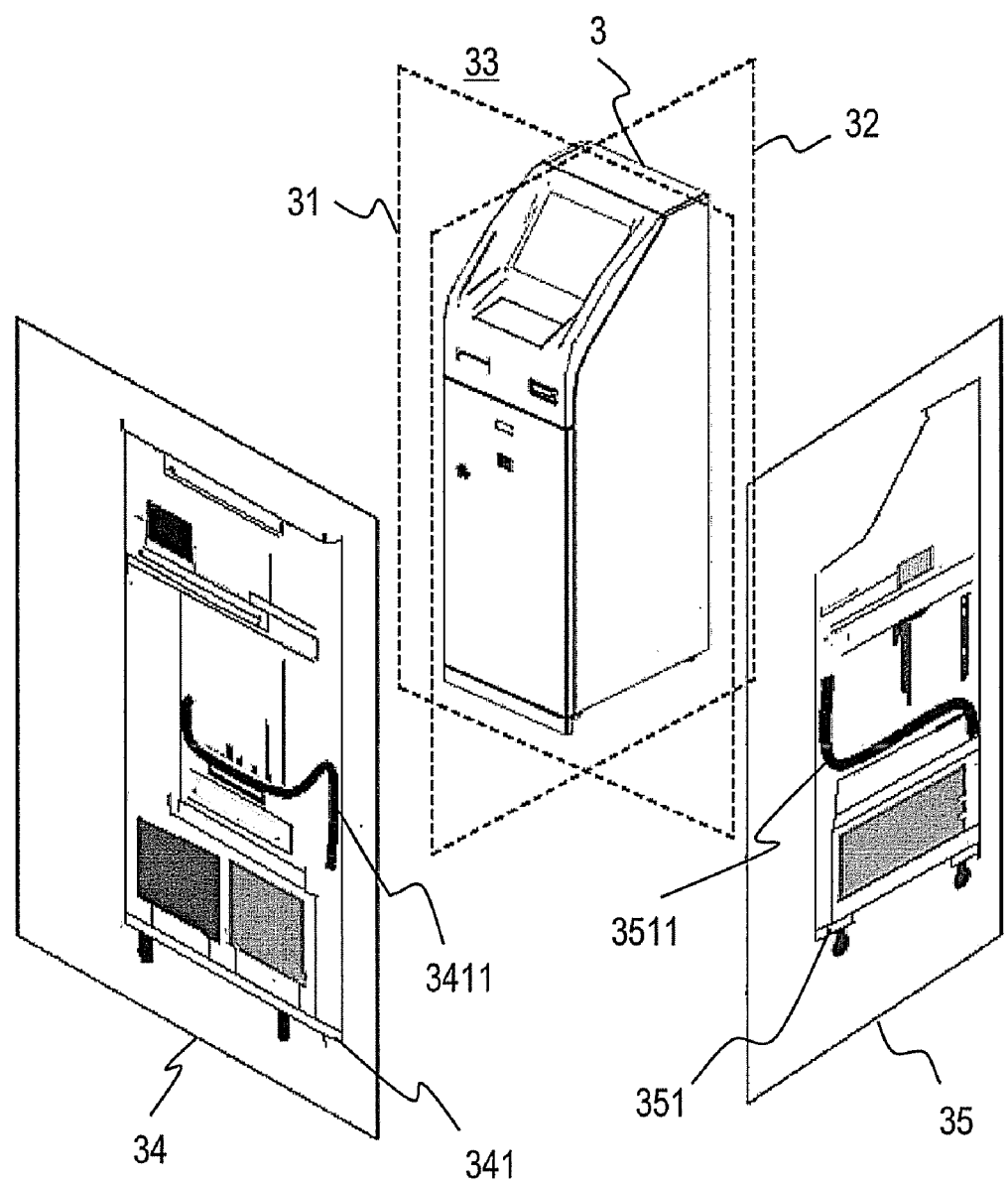
FIG. 7 illustrates a model plane displaying an overhead view of a three-dimensional model of an object, and also illustrates projection images of the three-dimensional model.

FIG. 7 illustrates an exemplary model plane that displays an overhead view of a three-dimensional model of the apparatus 3 and exemplary cross-sectional projection images of the three-dimensional model.

An X reference plane 31 and a Y reference plane 32 are set on the basis of setting information (vectors and coordinate values indicating positions in virtual space) about the reference planes No. 1 and No. 2, respectively, in the reference plane table 113.

A model plane 33 is a display area that displays a three-dimensional model of the apparatus 3 in a predetermined viewpoint. The three-dimensional model is generated in a predetermined virtual space on the basis of design data for the apparatus 3, the design data being stored in the information storage unit 11.

An X projection plane 34 is a display area that displays an X cross section 341 and an X projection route 3411. The X cross section 341 shows a two-dimensional shape of the apparatus 3, the two-dimensional shape being defined by intersection of a three-dimensional model of the apparatus 3 and the X reference plane 31. The X projection route 3411 shows a projected shape of a route of the harness 30.

Like the X projection plane 34, a Y projection plane 35 is a display area that displays a Y cross section 351 and a Y projection route 3511. The Y cross section 351 shows a two-dimensional shape of the three-dimensional model of the apparatus 3 in the Y reference plane 32. The Y projection route 3511 shows a projected shape of the route of the harness 30.

Figure 8:
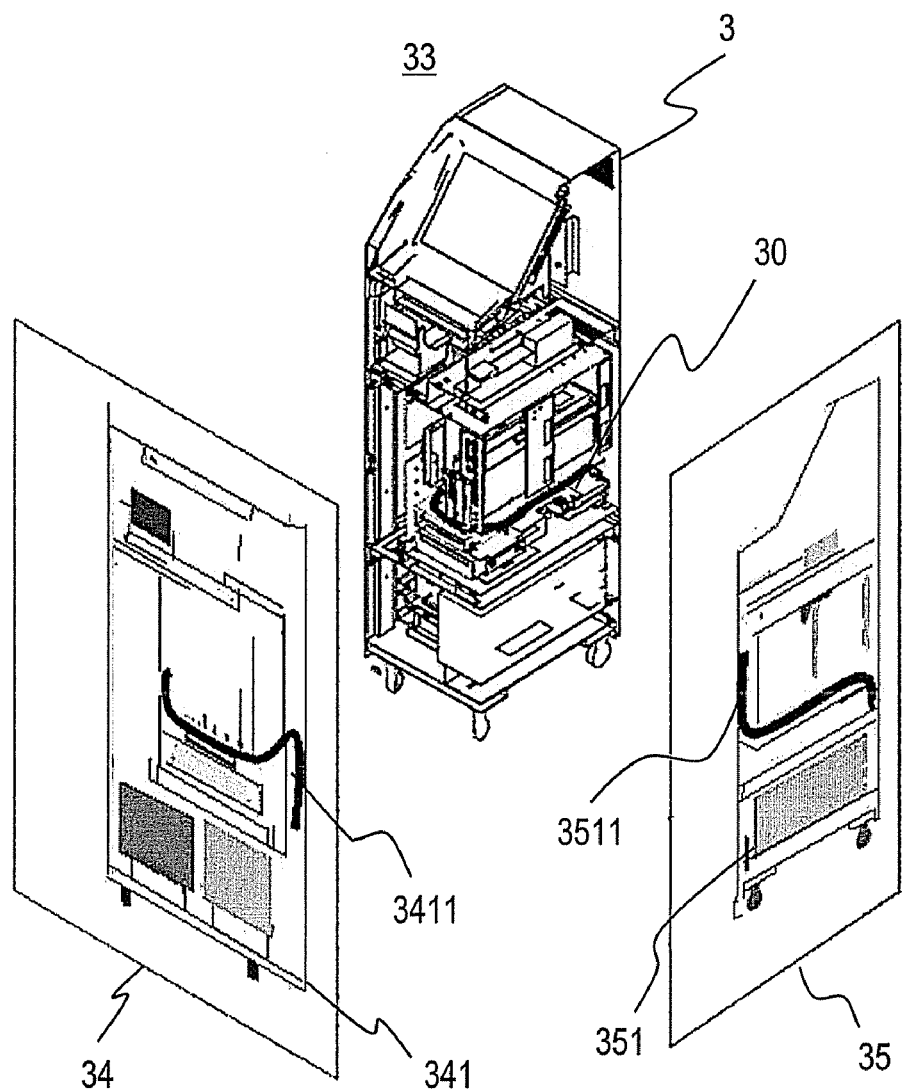
FIG. 8 illustrates a model plane and projection images displayed when clipping mode is selected for the three-dimensional model.

FIG. 8 illustrates an example of a model plane and projection images displayed when clipping mode is selected for the three-dimensional model of FIG. 7.

As illustrated in FIG. 8, the three-dimensional model clipped by the X reference plane 31 and the Y reference plane 32 are displayed on the model plane 33. Note that the X projection plane 34 and the Y projection plane 35 illustrated in FIG. 8 will not be described here, as they are the same as those illustrated in FIG. 7.

As illustrated in FIG. 1, the projection-plane drawing part 14 includes an operation-position designating unit 141, the pass-point editing unit 142, a cross-section-position changing unit 144, the cross-section drawing unit 145, the projection-route drawing unit 146, a pass-point determining unit 147, and a route-check-position display unit 148.

From a mouse pointer position detected by the pointing-position obtaining unit 12, the operation-position designating unit 141 identifies a projection plane serving as an operation plane. The operation-position designating unit 141 obtains the mouse pointer position in virtual space in a three-dimensional model, and passes the obtained mouse pointer position to the pass-point editing unit 142 and the cross-section-position changing unit 144.

On the basis of the mouse pointer position obtained from the operation-position designating unit 141, the pass-point editing unit 142 obtains a position in virtual space. Then, the pass-point editing unit 142 displays operation position marks MPx and MPy (see FIG. 9) indicating the obtained position in virtual space on the X projection plane 34 and the Y projection plane 35, respectively.

In the operation of selecting a pass point in the process of generating a route of the harness 30, the pass-point editing unit 142 determines the mouse pointer position as the position of a selected pass point P. On the basis of the position of the pass point P and the position of its previous pass point P, the pass-point editing unit 142 adds a section to the harness table 114, arranges the control points C1 to C6 that control a curve segment for the added section, and sets the result of calculation as detailed information about the added section in the section detail table 115.

In the operation of changing a pass point in the process of changing a route of the harness 30, the pass-point editing unit 142 determines the mouse pointer position as a changed position of a defined pass point P. Then, for a section related to the changed pass point P, the pass-point editing unit 142 arranges the control points C1 to C6 and updates the corresponding detailed information about the section in the section detail table 115.

The pass-point editing unit 142 can arrange the control points in accordance with a known method, which will not be described in detail here. For example, a method described in Japanese laid-open Patent Publication No. 2004-362191A or PCT International Patent Publication No. WO2004/104868 can be used.

The cross-section-position changing unit 144 obtains the position of the pass point P from the pass-point editing unit 142. On the basis of the obtained position of the pass point P, the cross-section-position changing unit 144 changes the positions (coordinate values) of the reference planes (the X reference plane 31 and the Y reference plane 32) and updates the corresponding information in the reference plane table 113 with the changed positions.

From the route-check-position display unit 148, the cross-section-position changing unit 144 obtains a position in virtual space corresponding to a position check mark ChMP for route verification. The position check mark ChMP is displayed on the route of the harness 30 in the process of route verification. Upon obtaining the position in virtual space from the route-check-position display unit 148, the cross-section-position changing unit 144 changes the positions (coordinate values) of the X reference plane 31 and Y reference plane 32, and updates the corresponding information in the reference plane table 113 with the changed positions.

The cross-section-position changing unit 144 may report the change in the reference plane table 113 to the cross-section drawing unit 145 and the clipping-position changing unit 132.

When there is a change in the reference plane table 113, the cross-section drawing unit 145 sets the X reference plane 31 and the Y reference plane 32 in virtual space on the basis of the reference plane table 113. The cross-section drawing unit 145 then generates the X cross section 341 showing a two-dimensional shape of a three-dimensional model of the apparatus 3 in the X reference plane 31, and the Y cross section 351 showing a two-dimensional shape of the three-dimensional model in the Y reference plane 32.

The projection-route drawing unit 146 generates a route of the harness 30 on the basis of the harness table 114 and the section detail table 115. The projection-route drawing unit 146 then generates the X projection route 3411 and the Y projection route 3511 on the X cross section 341 and the Y cross section 351, respectively. The X projection route 3411 shows the route of the harness 30 in the X reference plane 31, and the Y projection route 3511 shows the route of the harness 30 in the Y reference plane 32.

The pass-point determining unit 147 refers to design data (the model configuration table 111 and the shape table 112) for the apparatus 3 and determines whether the position of the selected pass point P is within a definition prohibited area which is a space area occupied by other components. If the position of selected pass point P is within the definition prohibited area, the pass-point determining unit 147 determines that it is not possible to define the pass point P. The pass-point determining unit 147 may determine, as the definition prohibited area, an area obtained by adding a predetermined margin to the space area occupied by the other components of the apparatus 3.

When the selected pass point P is within the definition prohibited area, the warning display unit 15 displays a mark or a message on the screen of the display device 23 to indicate that it is not possible to define the pass point P. The warning display unit 15 may identify an alternative position that can be defined and is closest from the selected pass point P, and may project the alternative position onto the X projection plane 34 and the Y projection plane 35.

In the process of verifying a route of the harness 30, the route-check-position display unit 148 displays projection routes (the X projection route 3411 and the Y projection route 3511) corresponding to the route of the harness 30 on the X cross section 341 and the Y cross section 351, respectively. The projection routes are generated on the basis of the harness table 114 and the section detail table 115. Additionally, the route-check-position display unit 148 displays the position check mark ChMP at a predetermined position (e.g., a start point of the route) of each projection route. The route-check-position display unit 148 then controls the position check mark ChMP such that it can move only in the range of the projection routes (the X projection route 3411 and the Y projection route 3511).

Upon detecting that the position check mark ChMP has been dragged with the mouse 21 by the user, the route-check-position display unit 148 converts the mouse pointer position obtained through the pointing-position obtaining unit 12 to its closest position on the route of the harness 30, and determines it as a new mouse pointer position. Then, the route-check-position display unit 148 displays position check marks ChMPx and ChMPy (see FIG. 12) at the corresponding positions on the X projection route 3411 and the Y projection route 3511, respectively, onto which the new mouse pointer position is projected.

On the basis of the harness table 114 and the section detail table 115, the route determining unit 16 generates and outputs design data for the harness 30 in a format that can be used by CAD systems etc.

A display example in each process of the harness verification apparatus 1 will now be described.

Harness Route Generation Process

Figure 9:
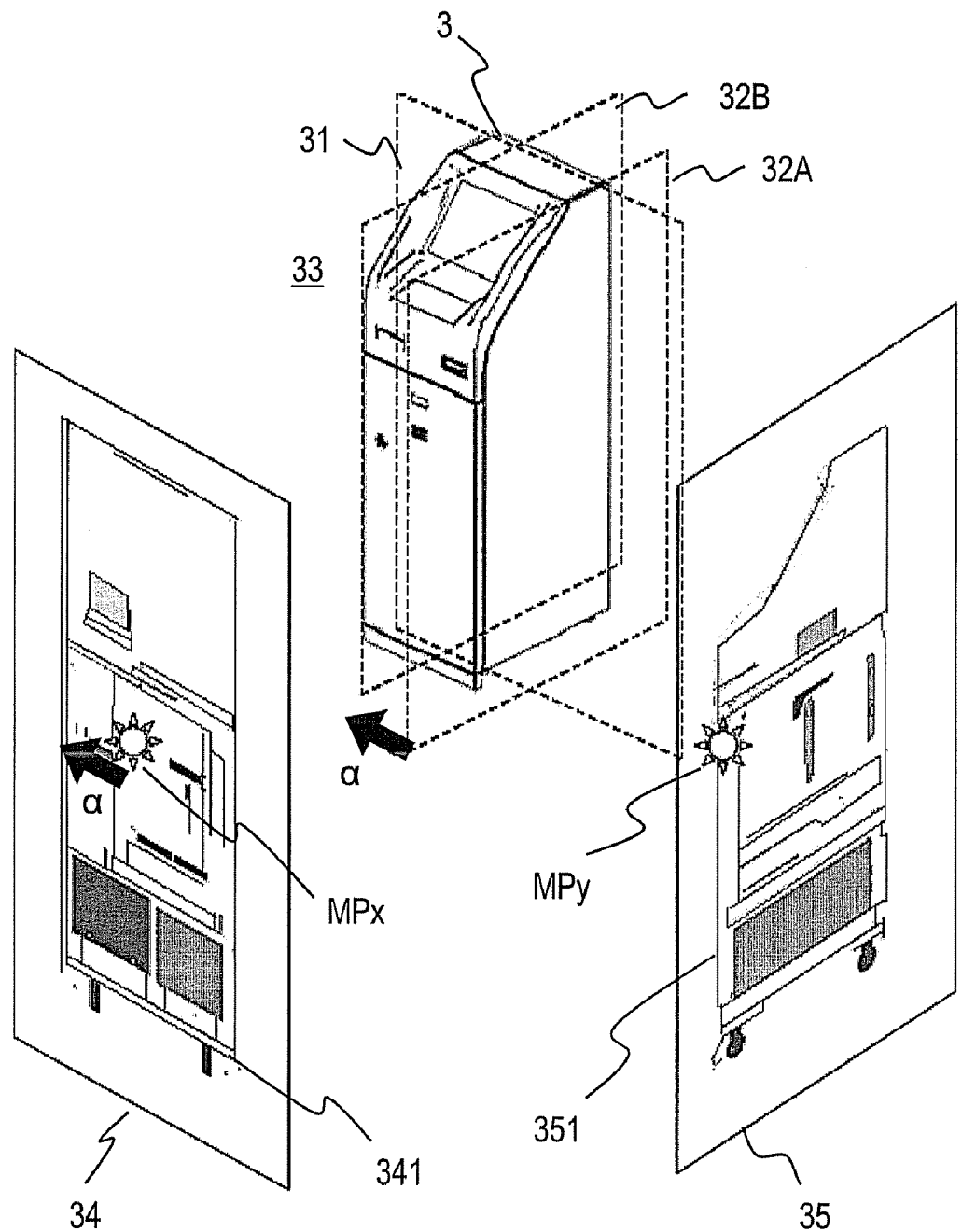
FIG. 9 illustrates projection images displayed when a pass point is moved in a harness route generation process.

FIG. 9 illustrates an entire model of the apparatus 3 and projection images of the model, the projection images being based on an X reference plane and a Y reference plane.

The cross-section drawing unit 145 obtains the positions of the X reference plane 31 and Y reference plane 32 from the reference plane table 113. The cross-section drawing unit 145 then draws the X cross section 341 and the Y cross section 351 on the X projection plane 34 and the Y projection plane 35, respectively. The X cross section 341 is a cross section onto which a two-dimensional shape of a three-dimensional model of the apparatus 3 in the X reference plane 31 is projected, and the Y cross section 351 is a cross section onto which a two-dimensional shape of the three-dimensional model in a Y reference plane 32A is projected.

Upon receiving, through a user interface, an instruction specifying a harness 30 for which a route is to be generated, the harness verification apparatus 1 refers to the harness table 114. If a route of the specified harness 30 is undefined, the harness verification apparatus 1 selects a position of a parent component (parent part) as a start point of the route. The parent component is, for example, a connector or a unit to which the harness 30 is to be connected. Alternatively, a position selected by the user with the mouse 21 on the X projection plane 34 may be set as a start point of the route.

As an operation position MP, the operation-position designating unit 141 obtains a position of a connector which is a parent component for the harness 30, or a position in virtual space pointed at with the mouse 21 by the user.

On the basis of the operation position MP in virtual space, the cross-section-position changing unit 144 updates the positions of the X reference plane 31 and Y reference plane 32 in the reference plane table 113.

The cross-section drawing unit 145 draws the X cross section 341 on the X projection plane 34 which displays the operation position mark MPx, and draws the Y cross section 351 on the Y projection plane 35 which displays the operation position mark MPy. The X cross section 341 is a cross section onto which a two-dimensional shape of the apparatus 3 in the X reference plane 31 is projected, and the Y cross section 351 is a cross section onto which a two-dimensional shape of the apparatus 3 in the Y reference plane 32A is projected. The operation position marks MPx and MPy are obtained by projecting one operation position MP in virtual space onto the X projection plane 34 and the Y projection plane 35, respectively.

Assume here that the user drags the operation position mark MPx with the mouse 21 on the X projection plane 34 which is an operation plane, and only a Y coordinate value of the operation position MP in virtual space is changed. In this case, on the basis of the moved operation position MP, the cross-section drawing unit 145 changes the position of the Y reference plane 32 in the reference plane table 113. On the basis of the changed reference plane table 113, the cross-section-position changing unit 144 changes the Y reference plane 32A to a Y reference plane 32B (as indicated by a in FIG. 9). The cross-section drawing unit 145 generates the Y cross section 351 of the three-dimensional model of the apparatus 3 on the basis of the Y reference plane 32B.

In this process, in synchronization with movement of the operation position mark MPx on the X projection plane 34, the Y cross section 351 at the changed operation position MP is drawn on the Y projection plane 35. Therefore, a cross section (two-dimensional shape) of the three-dimensional model of the apparatus 3, the cross section showing the operation position MP, is projected onto the Y projection plane 35 which is a tracking plane.

Figure 10:
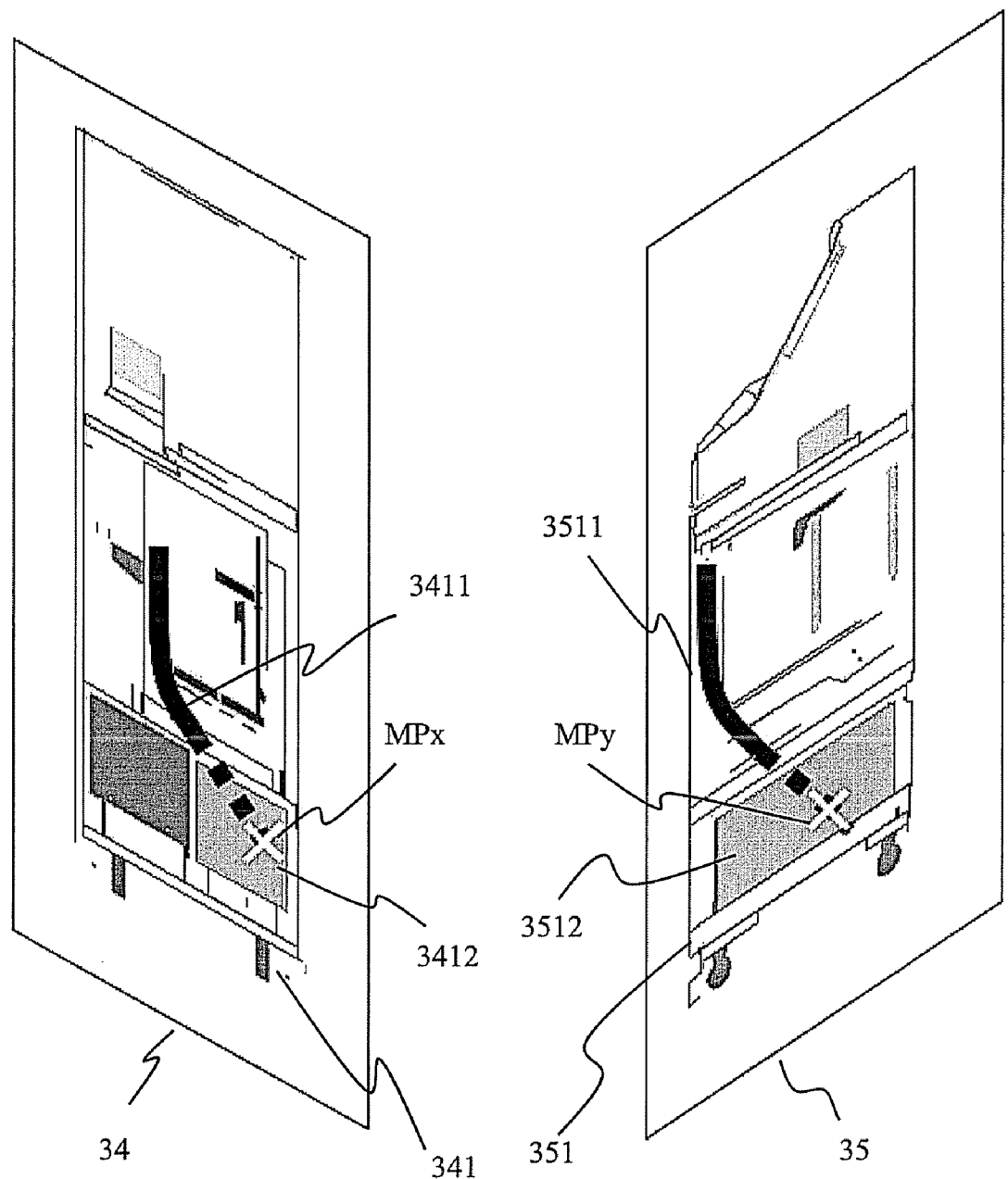
FIG. 10 illustrates projection images displayed when a determination is made as to whether a pass point can be defined in a harness route generation process.

FIG. 10 illustrates projection images displayed when a pass point of the harness 30 is specified.

Assume that after a start point (pass point P1) of a route is selected on the X projection plane 34 illustrated in FIG. 9, the mouse 21 is operated to select the next pass point P2.

As in the case of the process described above, when the operation-position designating unit 141 obtains the position of the operation position MP in virtual space, the cross-section-position changing unit 144 updates the reference plane table 113 on the basis of the moved operation position MR Then, on the basis of the reference plane table 113, the cross-section drawing unit 145 changes the positions of the X reference plane 31 and Y reference plane 32 in virtual space, and draws the X cross section 341 and the Y cross section 351 on the basis of the changed X reference plane 31 and Y reference plane 32.

The pass-point editing unit 142 sets the operation position MP as a position of the pass point P2, adds a section between the pass points P1 and P2 to the harness table 114, and generates detailed information about the added section in the section detail table 115. Then, on the basis of the harness table 114 and the section detail table 115, the projection-route drawing unit 146 draws the X projection route 3411 and the Y projection route 3511 on the X projection plane 34 and the Y projection plane 35, respectively. The X projection route 3411 and the Y projection route 3511 represent the route of the harness 30 in the X reference plane 31 and the Y reference plane 32, respectively, the route being represented by a curve segment corresponding to the section between the pass points P1 and P2.

When the position of the pass point P2 is obtained, the pass-point determining unit 147 determines whether the position of the pass point P2 is within a definition prohibited area on the basis of the model configuration table 111 and the shape table 112.

As illustrated in FIG. 10, a space area where components of the apparatus 3 are arranged is displayed as a definition prohibited area 3412 and a definition prohibited area 3512. The definition prohibited area 3412 is represented by a gray rectangular area in a two-dimensional model projected onto the X projection plane 34, and the definition prohibited area 3512 is represented by a gray rectangular area in a two-dimensional model projected onto the Y projection plane 35.

If the position of the pass point P2 indicated by the operation position mark MPx and the operation position mark MPy on the X projection plane 34 and the Y projection plane 35, respectively, is within the definition prohibited area 3412 and the definition prohibited area 3512, the warning display unit 15 displays a mark (e.g., "x" mark), instead of the operation position marks MPx and MPy, on the X projection plane 34 and the Y projection plane 35 to indicate that it is not possible to define the pass point P2.

When the pass point P2 is selected, the X reference plane 31 and the Y reference plane 32 are moved to the position of the pass point P2. Thus, the X cross section 341 and the Y cross section 351 each always containing the position of the pass point P2 are projected onto the X projection plane 34 and the Y projection plane 35, respectively. At the same time, the X projection route 3411 and the Y projection route 3511 representing the route of the harness 30 from the start point (pass point P1) to the pass point P2 are always projected onto the X projection plane 34 and the Y projection plane 35, respectively.

Thus, by simply selecting the pass point P on the route of the harness 30, it is possible to immediately check the configuration around the pass point P from multiple directions, without having to perform such operation as hiding (or not displaying) other components.

Additionally, if the pass point P to be selected is within a definition prohibited area, a mark or the like is displayed at the position of this pass point P to indicate that it is not possible to define this pass point P. Therefore, the user can quickly recognize on the projection planes that it is not appropriate to select this pass point P.

By repeating the operation described above, the user selects pass points to generate the route of the harness 30. When the user completes the selection of all pass points for defining the route and ends the selection operation, the pass-point editing unit 142 updates the harness table 114 and the section detail table 115, and reports the completion of the definition to the route determining unit 16.

The route determining unit 16 refers to the harness table 114 and the section detail table 115, and adds information about the shape and route of the harness 30 to the model configuration table 111 and the shape table 112 for the apparatus 3 in the information storage unit 11.

Harness Route Changing Process

Figure 11:
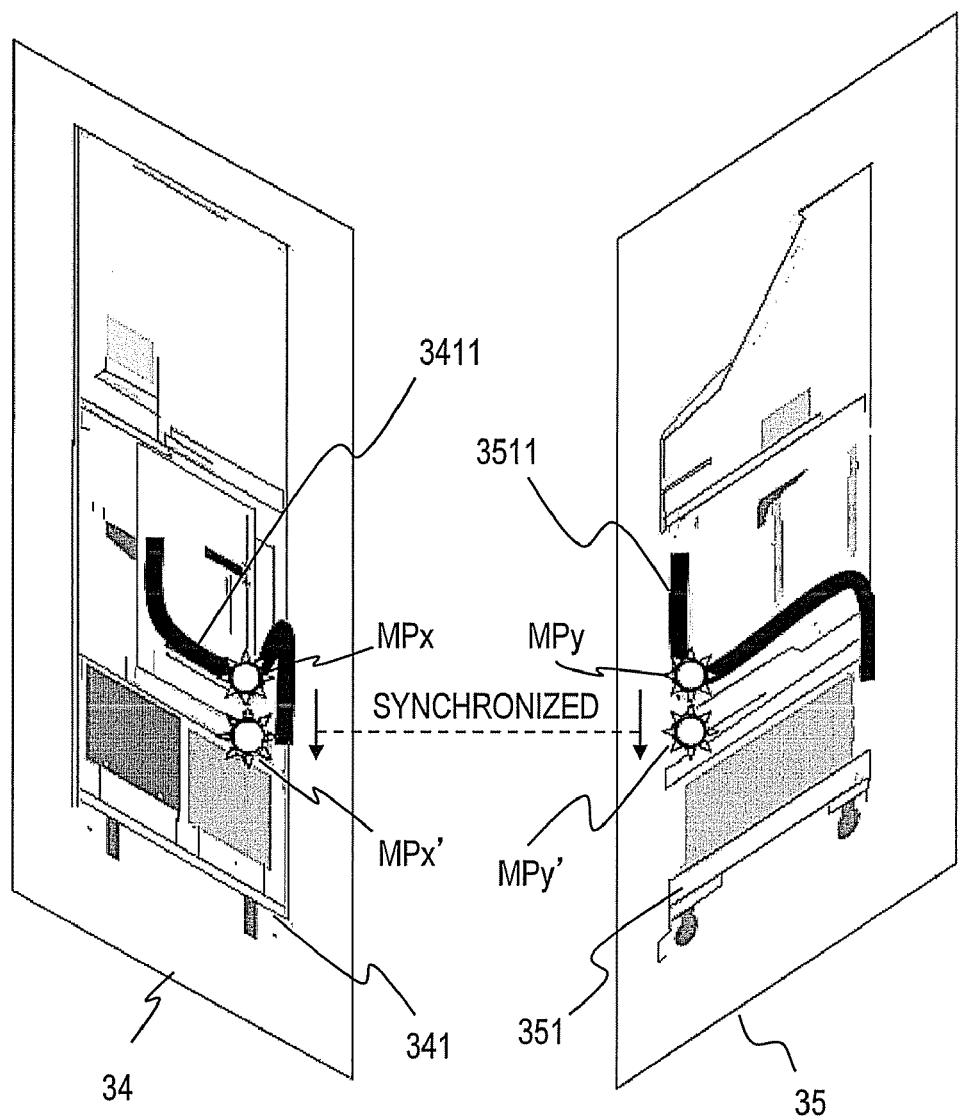
FIG. 11 illustrates projection images displayed when a pass point is changed in a harness route generation process.

FIG. 11 illustrates projection images displayed when a pass point of the harness 30 is changed.

In a harness route changing process, the X projection route 3411 and the Y projection route 3511 representing a route of the harness 30 are drawn in advance on the X projection plane 34 and the Y projection plane 35, respectively, on the basis of the harness table 114 and the section detail table 115.

For every pass point P that defines the route of the harness 30, the operation-position designating unit 141 displays the operation position marks MPx and MPy indicating the position of the pass point P on the X cross section 341 and the Y cross section 351, respectively.

After the user selects one pass point P and drags the corresponding operation position mark MPx or MPy with the mouse 21, the pointing-position obtaining unit 12 obtains a position of the pass point P (operation position MP) in virtual space, the pass point P being moved on an operation plane (e.g., the X projection plane 34).

Then, the cross-section-position changing unit 144 updates the reference plane table 113 on the basis of the position of the moved pass point P (i.e., pass point P'). The cross-section drawing unit 145 changes the positions of the X reference plane 31 and the Y reference plane 32 in virtual space on the basis of the updated reference plane table 113, and draws the X cross section 341 and the Y cross section 351 on the basis of the changed X reference plane 31 and Y reference plane 32.

The pass-point determining unit 147 determines whether the pass point P' is within a definition prohibited area.

If the pass point P' is not within the definition prohibited area, the pass-point editing unit 142 updates the corresponding information (i.e., information about sections before and after the pass point P') in the harness table 114 and the section detail table 115 on the basis of the position of the pass point P'.

On the basis of the updated harness table 114 and section detail table 115, the projection-route drawing unit 146 draws the X projection route 3411 and the Y projection route 3511 on the X projection plane 34 and the Y projection plane 35, respectively. The X projection route 3411 and the Y projection route 3511 represent the route of the harness 30 in the X reference plane 31 and the Y reference plane 32, respectively.

The operation-position designating unit 141 displays operation position marks MPx' and MPy' on the X cross section 341 and the Y cross section 351, respectively. The operation position marks MPx' and MPy' indicate the position of the pass point P'.

As described above, when the position of the pass point P is changed, the X reference plane 31 and the Y reference plane 32 are changed in accordance with the position of the pass point P'. Then, the X cross section 341 and the Y cross section 351, each showing a two-dimensional shape of a three-dimensional model of the apparatus 3 and the position of the pass point P', are projected onto the X projection plane 34 and the Y projection plane 35, respectively.

Thus, by simply correcting the pass point P on the route of the harness 30, it is possible to immediately check the configuration around the resulting pass point P' from multiple directions, without having to perform such operation as hiding (or not displaying) other components.

Note that although FIG. 10 and FIG. 11 illustrate only the X projection plane 34 and the Y projection plane 35, the model-display processing part 13 can also display the model plane 33 showing a three-dimensional model of the apparatus 3 in both the harness route generation and changing processes.

When clipping mode is selected, the model-display processing part 13 can display, on the model plane 33, a three-dimensional model that is clipped variously in accordance with movement of the X reference plane 31 and the Y reference plane 32.

Harness Route Verification Process

Figure 12:
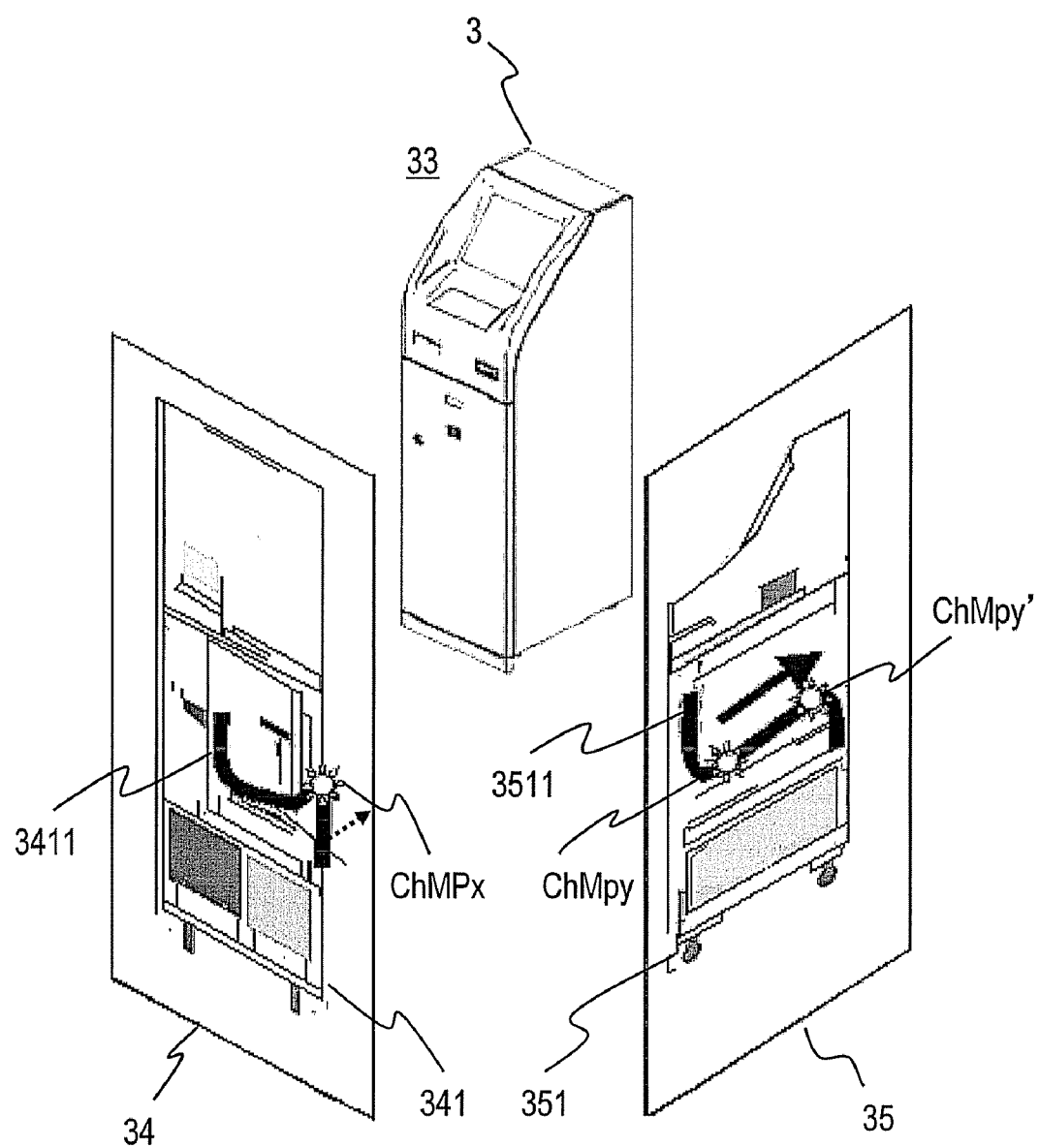
FIG. 12 illustrates projection images displayed in a harness route verification process.

FIG. 12 illustrates projection images displayed in a harness route verification process.

On the basis of the harness table 114 and the section detail table 115, the route-check-position display unit 148 reports to the cross-section-position changing unit 144 a predetermined position (e.g., a position of a start point) on the route of the harness 30 to be verified. The cross-section-position changing unit 144 updates the reference plane table 113 on the basis of the reported position. Then, the cross-section drawing unit 145 changes the positions of the X reference plane 31 and Y reference plane 32 in virtual space on the basis of the updated reference plane table 113, and draws the X cross section 341 and the Y cross section 351 on the basis of the changed X reference plane 31 and Y reference plane 32.

As in the case of the harness route changing process described above, the projection-route drawing unit 146 draws the X projection route 3411 and the Y projection route 3511 representing the route of the harness 30 on the X projection plane 34 and the Y projection plane 35, respectively, on the basis of the harness table 114 and the section detail table 115.

The route-check-position display unit 148 displays the position check mark ChMP (ChMPx and ChMPy) corresponding to the reported position on the X projection route 3411. When the user drags the position check mark ChMP with the mouse 21, the route-check-position display unit 148 obtains the position of the moved position check mark ChMP in virtual space from the pointing-position obtaining unit 12. The route-check-position display unit 148 determines, as the position of the moved position check mark ChMP, the position of the route of the harness 30 closest from the position obtained from the pointing-position obtaining unit 12. The route-check-position display unit 148 then projects the position check marks ChMPx and ChMPy corresponding to the position check mark ChMP onto the X projection plane 34 and the Y projection plane 35, respectively.

Figure 13:
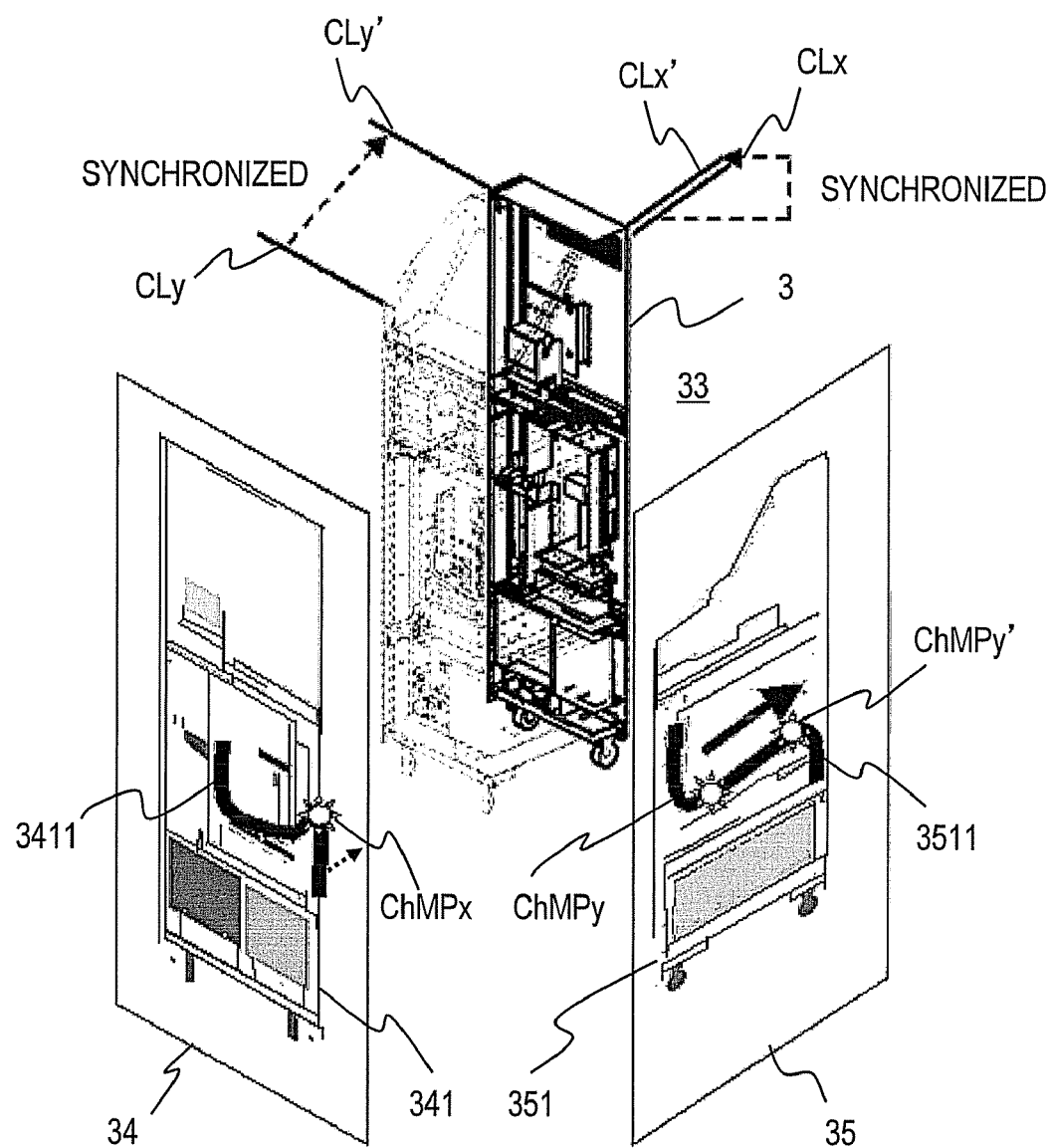
FIG. 13 illustrates a model plane and projection images displayed in synchronization with each other in a harness route verification process.

FIG. 13 illustrates an example in which the apparatus 3 is displayed in clipping mode in a harness route verification process.

When the position check mark ChMP is moved on the X projection plane 34 or the Y projection plane 35, the positions of the X reference plane 31 and Y reference plane 32 are updated on the basis of the position of the moved position check mark ChMP. In accordance with the updated positions of the X reference plane 31 and Y reference plane 32, the clipping-position changing unit 132 changes the clipping position from CLx to CLx' in the X axis direction, and from CLy to CLy' in the Y axis direction. Thus, the apparatus 3 is displayed in clipping mode in synchronization with movement of the position check mark ChMP.

Figure 14:
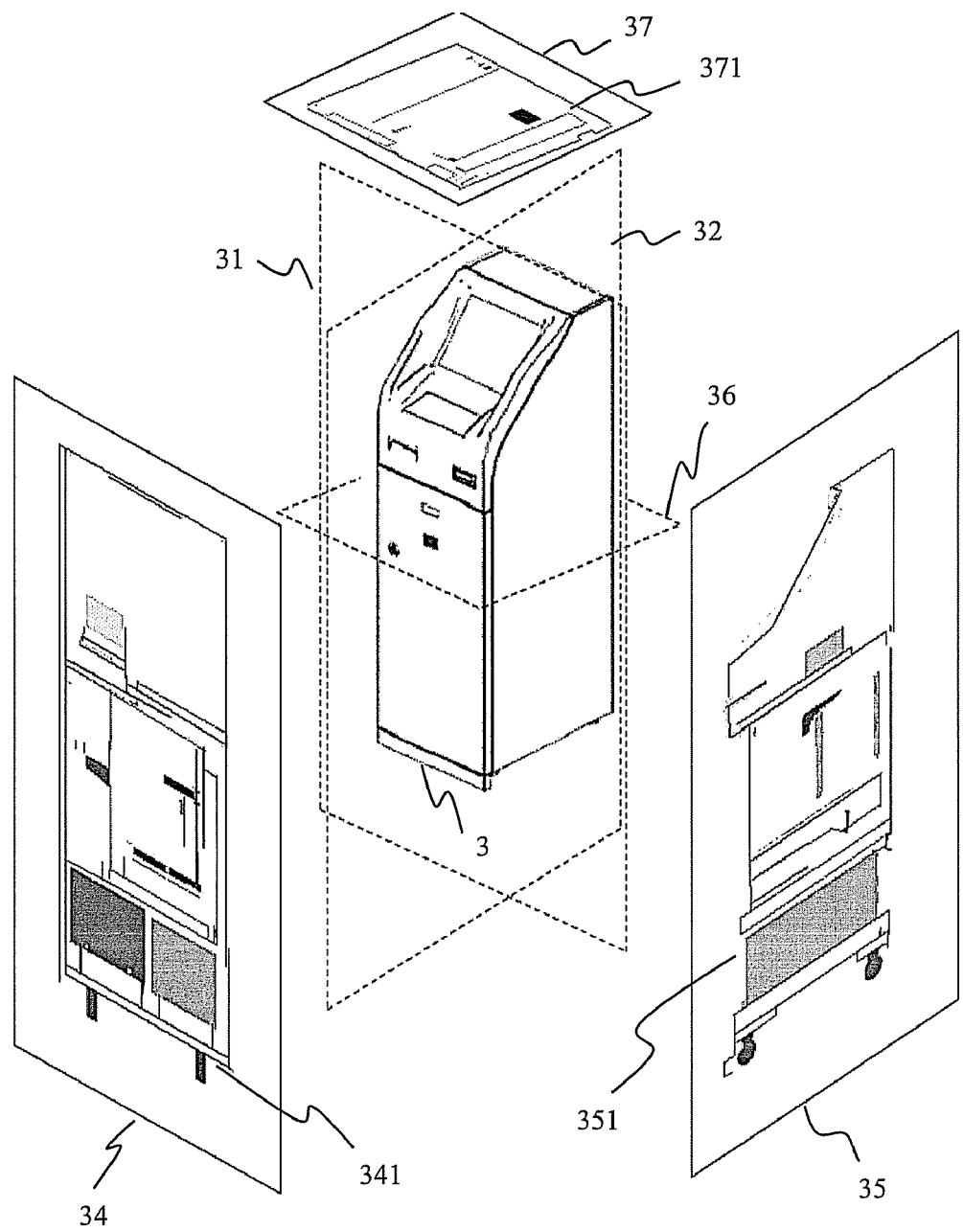
FIG. 14 illustrates an example where three reference planes are set.

FIG. 14 illustrates an example where three reference planes are set.

The harness verification apparatus 1 is capable of setting reference planes with different vectors. In the example of FIG. 14, three reference planes, i.e., an X reference plane, a Y reference plane, and a Z reference plane are set in virtual space where a three-dimensional model of the apparatus 3 is placed.

When a Z reference plane 36 is set, a Z cross section 371 that shows a two-dimensional shape of the three-dimensional model of the apparatus 3 in the Z reference plane 36 is drawn on a Z projection plane 37.

FIG. 15 to FIG. 18 are flowcharts illustrating processes performed by the harness verification apparatus 1.

The harness verification apparatus 1 starts each process by specifying a three-dimensional model of the apparatus 3 designed by the user.

Figure 15:
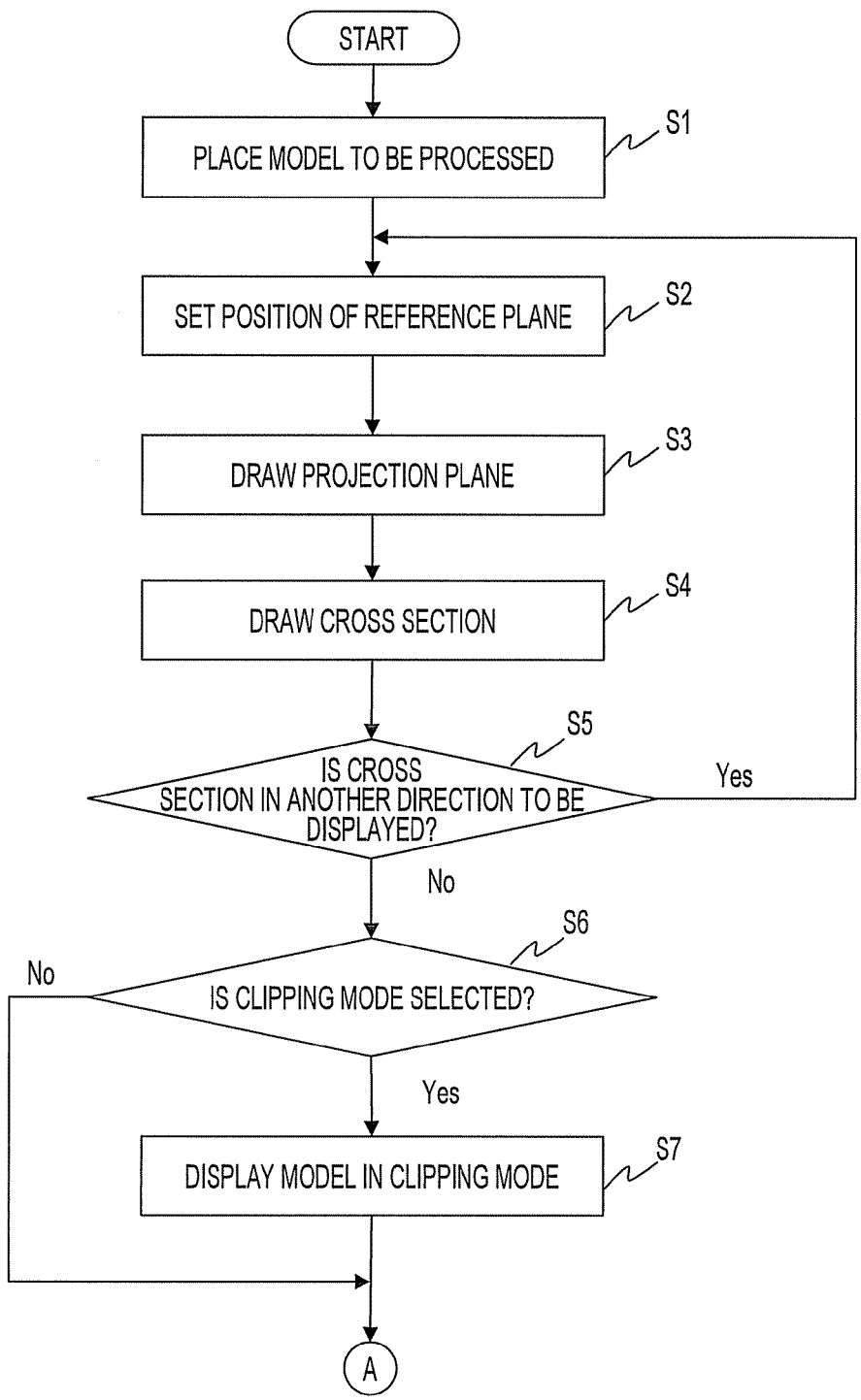
FIG. 15 is a flowchart illustrating a process of generating and changing a harness route.
Figure 16:
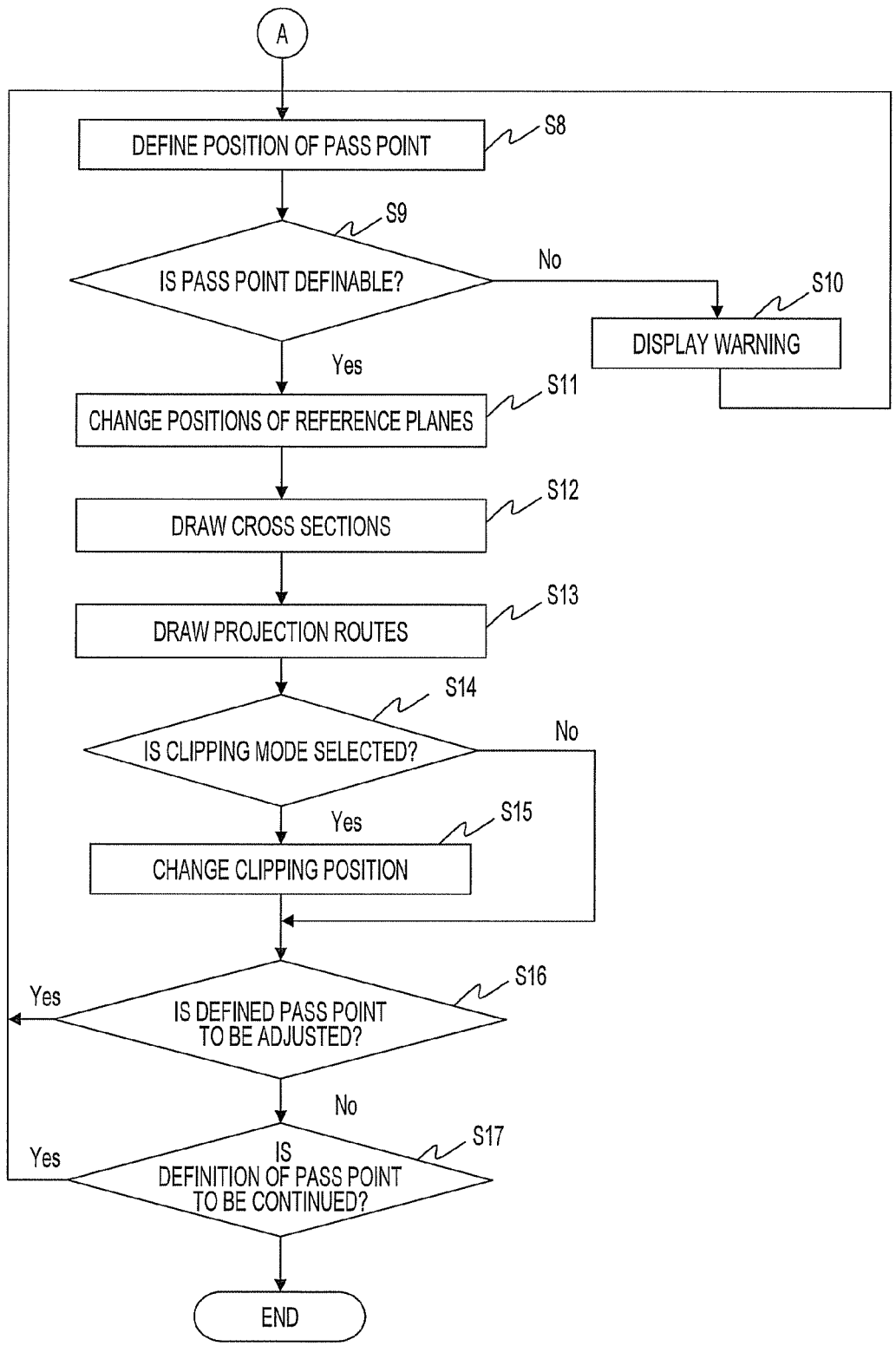
FIG. 16 is another flowchart illustrating the process of FIG. 15.

FIG. 15 and FIG. 16 are flowcharts illustrating a process of generating and changing a harness route.

From the information storage unit 11, the harness verification apparatus 1 reads design data for the apparatus 3 specified by the user, the design data being stored in the model configuration table 111 and the shape table 112. The harness verification apparatus 1 places a three-dimensional model of the apparatus 3 in a predetermined virtual space, and draws a model shape showing an overhead view of the three-dimensional model on the model plane 33 (step Si).

The cross-section-position changing unit 144 reads one reference plane from the reference plane table 113 in the information storage unit 11 and sets the position of the X reference plane 31 (step S2). The projection-plane drawing part 14 draws the X projection plane 34 corresponding to the X reference plane 31 (step S3). The cross-section drawing unit 145 draws, on the X projection plane 34, the X cross section 341 showing a two-dimensional shape of the apparatus 3 in the X reference plane 31 (step S4).

If a cross section in another direction (e.g., Y axis direction) is also to be displayed (YES in step S5), steps S2 to S5 are repeated to draw the Y cross section 351 on the Y projection plane 35 corresponding to the Y reference plane 32.

If a cross section in still another direction (e.g., Z axis direction) is also to be displayed (YES in step S5), in other words, if three cross sections are to be displayed, steps S2 to S5 are repeated to draw the Z cross section 371 on the Z projection plane 37 corresponding to the Z reference plane 36 (see FIG. 14).

If a cross section in no other direction is to be displayed (NO in step S5), a determination is made as to whether clipping mode is selected in the reference plane table 113 (step S6). If clipping mode is selected (YES in step S6), the clipping-display processing unit 131 draws a clipped three-dimensional model of the apparatus 3 on the model plane 33 on the basis of a position (i.e., one or more reference plane positions) set by the clipping-position changing unit 132 (step S7). On the other hand, if the clipping-display processing unit 131 determines that clipping mode is not selected (NO in step S6), the process proceeds to step S8.

Next, the pass-point editing unit 142 obtains the operation position MP from the operation-position designating unit 141 and determines it as a position of the pass point P of the harness 30. On the basis of the harness table 114 and the section detail table 115, the pass-point editing unit 142 defines a route (curve segment) corresponding to a section between the obtained pass point P and its previous pass point P (step S8).

On the basis of the model configuration table 111 and the shape table 112, the pass-point determining unit 147 determines whether the obtained pass point P is within a definition prohibited area. If the obtained pass point P is within the definition prohibited area and thus cannot be defined (NO in step S9), the pass-point determining unit 147 displays a warning mark at the operation position MP (step S10).

If the obtained pass point P is outside the definition prohibited area and thus can be defined (YES in step S9), the cross-section-position changing unit 144 changes the reference plane positions in the reference plane table 113 on the basis of the position of the pass point P (step S11).

On the basis of the changed reference plane table 113, the cross-section drawing unit 145 draws the X cross section 341 and the Y cross section 351 on the X projection plane 34 and the Y projection plane 35, respectively (step S12). Additionally, the projection-route drawing unit 146 draws the X projection route 3411 and the Y projection route 3511 showing the defined route of the harness 30 on the X cross section 341 and the Y cross section 351, respectively (step S13).

The clipping-position changing unit 132 refers to the reference plane table 113 to determine whether clipping mode is selected for any reference plane. If clipping mode is selected (YES in step S14), the clipping-position changing unit 132 changes the clipping position on the basis of the reference plane table 113 and reports the changed clipping position to the clipping-display processing unit 131. The clipping-display processing unit 131 displays the three-dimensional model of the apparatus 3 at the changed clipping position (step S15).

If the harness verification apparatus 1 has received an instruction to adjust the defined pass point through a user interface (YES in step S16), the process returns to step S8. On the other hand, if no instruction to adjust the defined pass point has been received from the user (NO in step S16), an instruction as to whether to continue defining a pass point is received from the user. If an instruction to continue defining a pass point has been received (YES in step S17), the process returns to step S8. If no instruction to continue defining a pass point has been received (NO in step S17), the process ends here.

Figure 17:
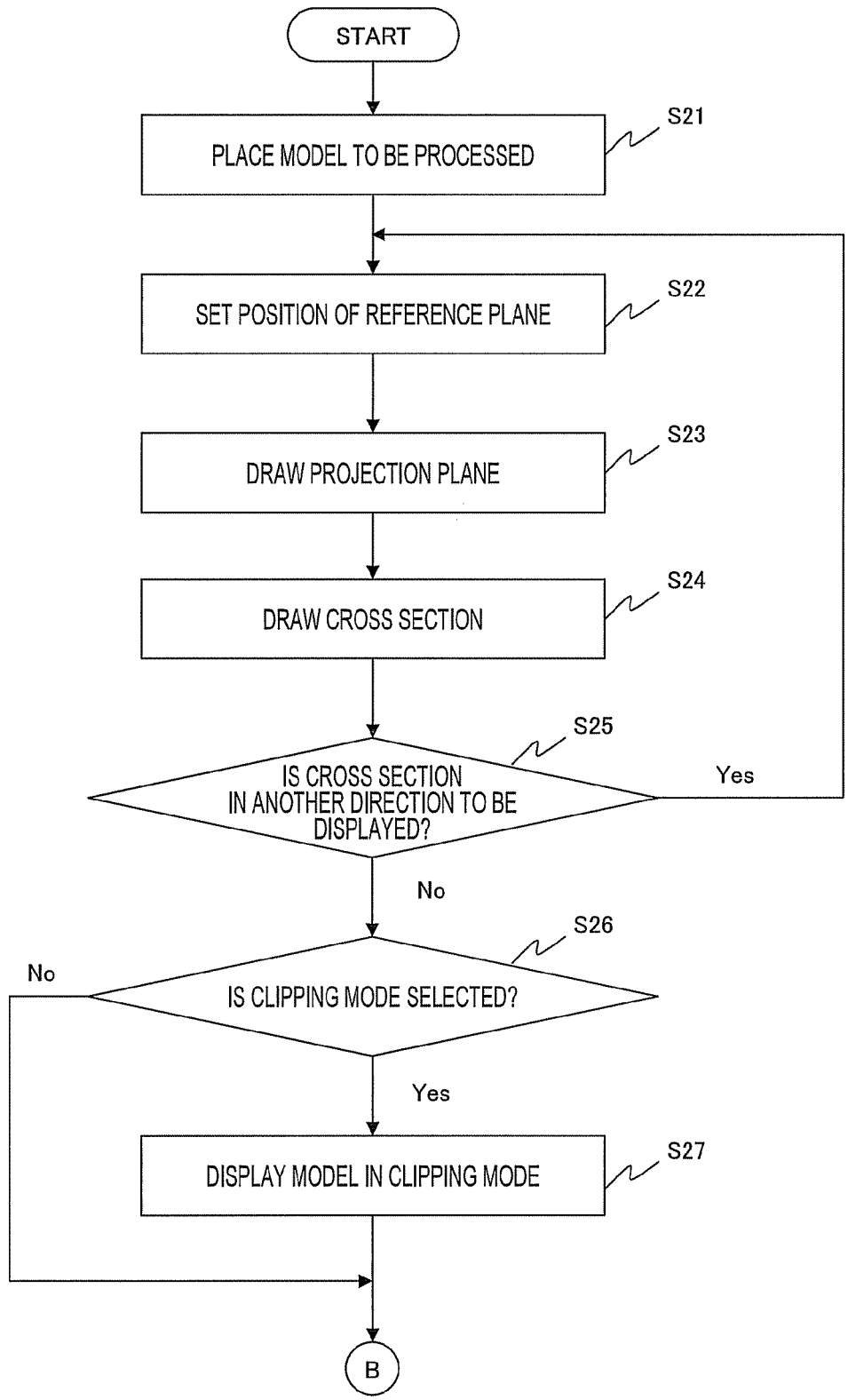
FIG. 17 is a flowchart illustrating a process of harness route verification.
Figure 18:
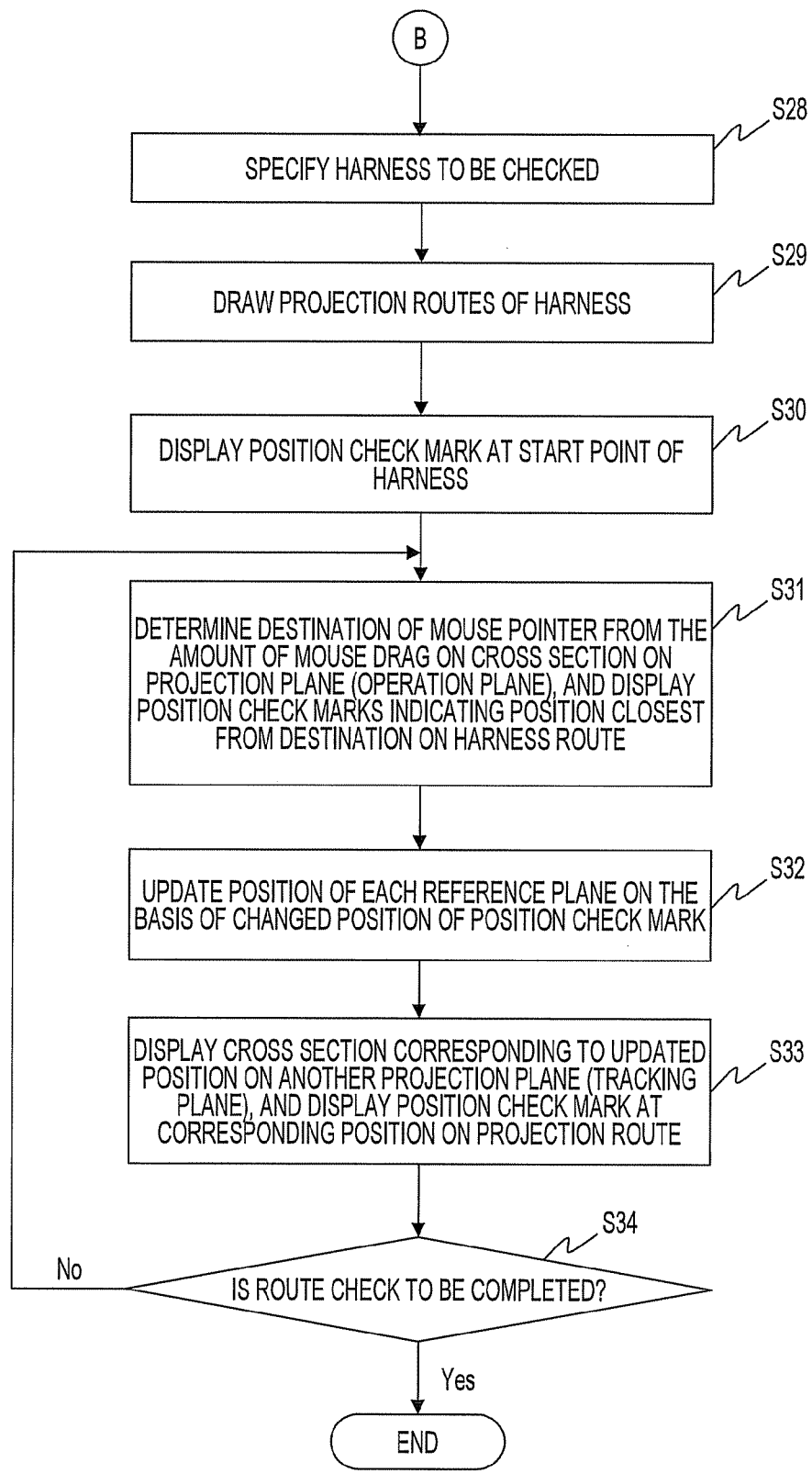
FIG. 18 is another flowchart illustrating the process of FIG. 17.

FIG. 17 and FIG. 18 are flowcharts illustrating a harness route verification process.

Steps S21 to S27 (FIG. 17) in the harness route verification process will not be described here, as they are the same as steps S1 to S7 (FIG. 15) in the harness route generation and changing process. Hereinafter, step S28 and the following steps in FIG. 18 will be described.

When an instruction to check the route of the harness 30 is received through the user interface (step S28), the route-check-position display unit 148 draws the X projection route 3411 and the Y projection route 3511, each representing a two-dimensional shape of the route of the harness 30, on the X cross section 341 and the Y cross section 351, respectively (step S29).

The route-check-position display unit 148 then displays the position check mark ChMP at a position on a projection route, the position corresponding to any position (e.g., a start point of the route) of the harness 30 (step S30).

When the X projection plane 34 serves as an operation plane, if the position check mark ChMP on the X projection route 3411 is dragged with the mouse 21 on the X cross section 341, the destination of the position check mark ChMP is determined from the amount of movement of the mouse 21. Then, the position check marks ChMPx and ChMPy indicating a position on the route of the harness 30, the position being closest from the destination of the position check mark ChMP, are displayed on the X cross section 341 and the Y cross section 351, respectively (step S31).

On the basis of the changed position of the position check mark ChMP, the cross-section-position changing unit 144 updates the position of each reference plane in the reference plane table 113 (step S32). On the basis of the updated reference plane table 113, the cross-section drawing unit 145 sets the X reference plane 31 and the Y reference plane 32, and draws the Y cross section 351 corresponding to the updated Y reference plane 32 on the Y projection plane 35, which is a tracking plane. Additionally, the route-check-position display unit 148 displays the position check mark ChMPy at the corresponding position on the Y projection route 3511 on the Y cross section 351 (step S33).

Then, an instruction as to whether to end the route check is received through the user interface. If the received instruction is not an instruction to complete the route check (NO in step S34), the process returns to step S31. If the received instruction is an instruction to complete the route check (YES in step S34), the process ends here.

Figure 19:
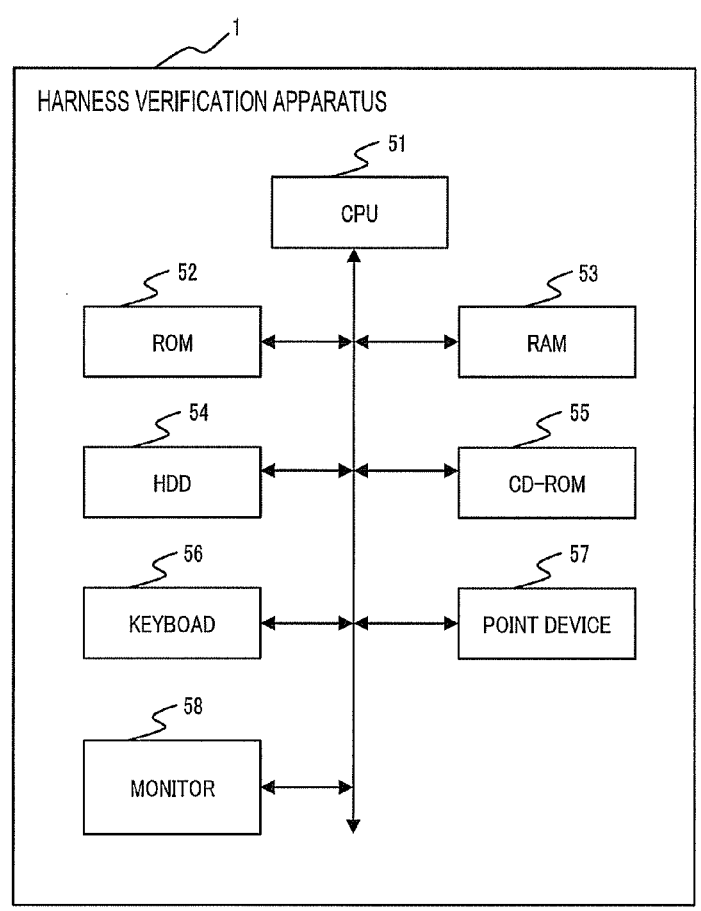
FIG. 19 illustrates an exemplary hardware configuration of the harness verification apparatus illustrated in FIG. 1.
Figure 20C:
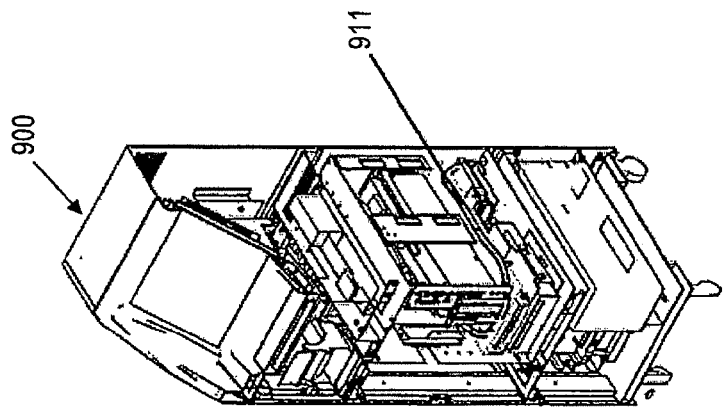
FIG. 20A to FIG. 20C describe related art examined by the present inventors.
Figure 20B:
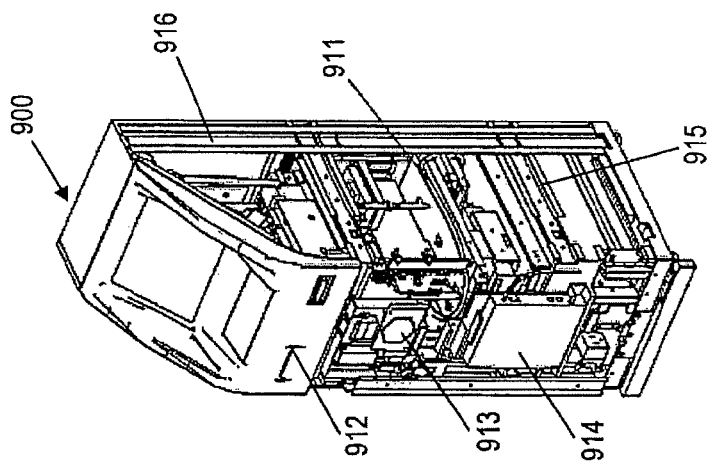
Figure 20A:
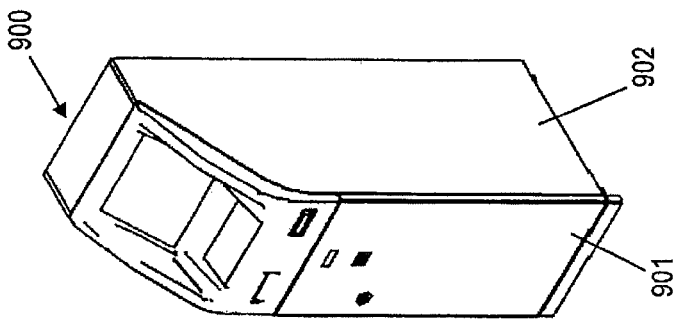

FIG. 19 illustrates an exemplary hardware configuration of the harness verification apparatus 1.

As illustrated in FIG. 19, the operation of the harness verification apparatus 1 can be implemented by a computer including a central processing unit (CPU) 51, a read-only memory (ROM) 52, a random-access memory (RAM) 53, an external storage device (hard disk drive (HDD)) 54, a compact disk-read-only memory (CD-ROM) 55, a keyboard 56, a pointing device 57, and a monitor 58. Each processing unit of the harness verification apparatus 1 illustrated in FIG. 1 is realized by an application program installed on and executed by the computer. By working together with the hardware of the computer, the application program allows the above-described processes of the harness verification apparatus 1 to be performed.

The information storage unit 11, which is included in the harness verification apparatus 1 in FIG. 1, may be connected through a network or the like to the harness verification apparatus 1.

FIG. 1 shows no input devices other than the mouse 21 serving as a three-dimensional pointing device. However, as illustrated in FIG. 19, the harness verification apparatus 1 includes other input devices, such as the keyboard 56 and the pointing device 57. The keyboard 56 is used to input data, such as commands and text. The pointing device 57 is used to input selection instructions. The display device 23 illustrated in FIG. 1 corresponds to the monitor 58 illustrated in FIG. 19.

As an embodiment of the present invention, an application program that implements the operation of the harness verification apparatus 1 can be stored in the HDD 54 in advance. Alternatively, the application program may be recorded in a CD-ROM medium, from which the harness verification apparatus 1 reads the application program and stores it in the RAM 53 and the HDD 54. In other words, the application program installed in the CD-ROM medium allows the computer (including the CPU 51 and the RAM 53) to operate as the harness verification apparatus 1. The CD-ROM medium may be other types of recording media.

With the harness verification apparatus 1 according to the embodiments described above, in the processes of generation and verification of the route of the harness 30 included in the apparatus 3, users do not have to frequently perform an operation for switching between hiding and displaying components of the apparatus 3. The harness verification apparatus 1 thus can improve work efficiency, reduce work burden, and reduce the number of worker-hours for harness route generation and verification.

The harness verification apparatus 1 is capable of associating the position of clipping display of a three-dimensional model of the apparatus 3 and the positions of cross sections of the apparatus 3 with the position of a user's desired pass point of the harness 30, and allowing them to be displayed in synchronization with each other. Thus, at a position near the desired pass point of the harness 30, the user can easily recognize the shape of the model of the apparatus 3. The harness verification apparatus 1 thus can provide improved accuracy in generation and verification of harness routes.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that various changes, substitutions, and alterations could be made hereto without departing from the spirit and scope of the invention.

What is claimed is:

1. A harness verification apparatus that displays a harness route on a three-dimensional model of an object, the three-dimensional model being placed in virtual space, the harness verification apparatus comprising:
    a display unit configured to display a projection image of the three-dimensional model;
    a pointing input unit configured to provide an amount of movement in three-dimensional space;
    an information storage unit configured to store design data and reference plane data, the design data representing an arrangement and shapes of components included in the object, the reference plane data representing settings of a plurality of reference planes in virtual space;
    a model-display processing unit configured to place the three-dimensional model in virtual space and display a model plane on the display unit, the model plane being a plane onto which an overhead view of the placed three-dimensional model is projected;
    a cross-section drawing unit configured to set a plurality of reference planes in virtual space on the basis of the reference plane data and display cross-section projection planes on the display unit, the cross-section projection planes each being a plane onto which a cross section defined by intersection of the three-dimensional model and one of the plurality of reference planes is projected;
    a pointing-position obtaining unit configured to obtain a pointing position in virtual space on the basis of an amount of movement of the pointing position, the movement being made by operating the pointing input unit;
    an operation-position designating unit configured to designate the pointing position as an operation position;
    a cross-section-position changing unit configured to change vectors of the plurality of reference planes on the basis of the operation position and store the reference plane data about the changed reference planes in the information storage unit;
    a pass-point editing unit configured to identify the operation position as a pass point of a harness included in the object, generate one or more curve segments each corresponding to a section between two adjacent pass points when a plurality pass points are identified, and store, in the information storage unit, definition information about a route of the harness defined on the basis of a curve obtained by joining the curve segments; and
    a projection-route drawing unit configured to display a projection route of the harness on each of the cross-section projection planes, the projection route being generated on the corresponding cross section on the basis of the definition information.

2. The harness verification apparatus according to claim 1, wherein the model-display processing unit includes a clipping-display processing unit configured to refer to the reference plane data and display a model plane on the display unit, the model plane being a plane onto which a shape obtained by hiding a part of the three-dimensional model in a predetermined direction from each of the cross sections is projected.

3. The harness verification apparatus according to claim 1, further comprising a pass-point determining unit configured to identify a space area occupied by components of the object as a definition prohibited area on the basis of the design data, the definition prohibited area being a space area where the harness cannot pass through, and to determine whether the operation position designated by the operation-position designating unit is within the definition prohibited area,
    wherein if the operation position is within the definition prohibited area, the pass-point editing unit does not set the operation position as a pass point.

4. The harness verification apparatus according to claim 1, further comprising a route-check-position display unit configured to display a position check mark for checking purposes on the projection route displayed on each of the cross-section projection planes, convert the operation position designated by the operation-position designating unit to a position closest from the operation position on the route of the harness, and display the position check mark at the converted position.

5. A harness verification method that displays a harness route on a three-dimensional model of an object, the three-dimensional model being placed in virtual space, the harness verification method comprising:
    placing the three-dimensional model in virtual space and displaying a model plane on a display unit, the model plane being a plane onto which an overhead view of the placed three-dimensional model is projected;
    setting a plurality of reference planes in virtual space on the basis of reference plane data stored in an information storage unit and displaying cross-section projection planes on the display unit, the cross-section projection planes each being a plane onto which a cross section defined by intersection of the three-dimensional model and one of the plurality of reference planes is projected;
    obtaining a pointing position in virtual space on the basis of amount of movement of the pointing position, the movement being made by operating a pointing input unit;
    designating the pointing position as an operation position;

changing vectors of the plurality of reference planes on the basis of the operation position and storing the reference plane data about the changed reference planes in the information storage unit;

identifying the operation position as a pass point of a harness included in the object, generating one or more curve segments each corresponding to a section between two adjacent pass points when a plurality pass points are identified, and storing in the information storage unit definition information about a route of the harness defined on the basis of a curve obtained by joining the curve segments; and displaying a projection route of the harness on each of the cross-section projection planes, the projection route being generated on the corresponding cross section on the basis of the definition information.

6. A non-transitory storage medium that is readable by a computer and that stores a harness verification program causing a harness route to be displayed on a three-dimensional model of an object, the three-dimensional model being placed in virtual space, the harness verification program causing the computer to execute the steps of:

displaying a projection image of the three-dimensional model on a display unit;

storing design data and reference plane data in an information storage unit, the design data representing an arrangement and shapes of components included in the object, the reference plane data representing settings of a plurality of reference planes in virtual space;

placing the three-dimensional model in virtual space and displaying a model plane on the display unit, the model plane being a plane onto which an overhead view of the placed three-dimensional model is projected;

setting a plurality of reference planes in virtual space on the basis of the reference plane data and displaying cross-section projection planes on the display unit, the cross-section projection planes each being a plane onto which a cross section defined by intersection of the three-dimensional model and one of the plurality of reference planes is projected;

obtaining a pointing position in virtual space on the basis of the amount of movement of the pointing position, the movement being made by operating a pointing input unit;

designating the pointing position as an operation position;

changing vectors of the plurality of reference planes on the basis of the operation position, and storing the reference plane data about the changed reference planes in the information storage unit;

identifying the operation position as a pass point of a harness included in the object, generating one or more curve segments each corresponding to a section between two adjacent pass points when a plurality pass points are identified, and storing in the information storage unit definition information about a route of the harness defined on the basis of a curve obtained by joining the curve segments; and displaying a projection route of the harness on each of the cross-section projection planes, the projection route being generated on the corresponding cross section on the basis of the definition information.

\* \* \* \* \*